(12) United States Patent
Pervan et al.

(10) Patent No.: US 11,987,990 B2
(45) Date of Patent: *May 21, 2024

(54) MECHANICAL LOCKING OF FLOOR PANELS WITH VERTICAL SNAP FOLDING

(71) Applicant: Välinge Innovation AB, Viken (SE)

(72) Inventors: Darko Pervan, Viken (SE); Marcus Nilsson Ståhl, Höganäs (SE)

(73) Assignee: Välinge Innovation AB, Viken (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/057,811

(22) Filed: Nov. 22, 2022

(65) Prior Publication Data

US 2023/0220680 A1 Jul. 13, 2023

Related U.S. Application Data

(63) Continuation of application No. 16/253,465, filed on Jan. 22, 2019, now Pat. No. 11,519,183, which is a
(Continued)

(51) Int. Cl.
*E04F 15/02* (2006.01)
*E04F 13/08* (2006.01)
(Continued)

(52) U.S. Cl.
CPC .......... *E04F 15/02* (2013.01); *E04F 13/0894* (2013.01); *E04F 15/02033* (2013.01);
(Continued)

(58) Field of Classification Search
CPC ..... E04F 15/02; E04F 15/02038; E04F 15/04; E04F 15/107; E04F 15/181; E04F 15/105;
(Continued)

(56) References Cited

U.S. PATENT DOCUMENTS

| 124,228 A | 3/1872 | Stuart |
| 213,740 A | 4/1879 | Conner |

(Continued)

FOREIGN PATENT DOCUMENTS

| CA | 2252791 A1 | 5/1999 |
| CA | 2456513 A1 | 2/2003 |

(Continued)

OTHER PUBLICATIONS

Bergelin, Marcus, et al., U.S. Appl. No. 13/552,357 entitled "Resilient Groove," filed Jul. 18, 2012.
(Continued)

*Primary Examiner* — Jessica L Laux
(74) *Attorney, Agent, or Firm* — Boone IP Law

(57) ABSTRACT

Floor panels are shown, which are provided with a mechanical locking system on long and short edges allowing installation with vertical snap folding that could be accomplished automatically without tools and where the short edge locking system has a tongue made in one piece with the panel. The floor panels may have a first and a second connector at the long edges that are configured to obtain a minimum of friction facilitating a displacement, by a spring back force from the bending of a short edge locking strip, of a new panel in a horizontal direction along the long edge during the vertical snap folding action.

15 Claims, 12 Drawing Sheets

Related U.S. Application Data continuation of application No. 15/695,437, filed on Sep. 5, 2017, now Pat. No. 10,214,917, which is a continuation of application No. 14/947,436, filed on Nov. 20, 2015, now Pat. No. 9,777,487, which is a continuation of application No. 14/011,121, filed on Aug. 27, 2013, now Pat. No. 9,212,492, which is a continuation of application No. 13/660,538, filed on Oct. 25, 2012, now Pat. No. 8,544,234, which is a continuation of application No. 12/266,762, filed on Nov. 7, 2008, now Pat. No. 8,353,140.

(60) Provisional application No. 60/986,077, filed on Nov. 7, 2007.

(51) Int. Cl.
| | | |
|---|---|---|
| *E04F 15/10* | (2006.01) | |
| *H01F 7/02* | (2006.01) | |
| *H01F 7/122* | (2006.01) | |
| *H04M 1/02* | (2006.01) | |
| *H04M 1/18* | (2006.01) | |
| *H04M 1/7246* | (2021.01) | |
| *E04F 15/04* | (2006.01) | |
| *H04M 1/04* | (2006.01) | |
| *H04M 1/21* | (2006.01) | |

(52) U.S. Cl.
CPC ...... *E04F 15/02038* (2013.01); *E04F 15/102* (2013.01); *E04F 15/107* (2013.01); *H01F 7/0252* (2013.01); *H01F 7/122* (2013.01); *H04M 1/0256* (2013.01); *H04M 1/0262* (2013.01); *H04M 1/0279* (2013.01); *H04M 1/185* (2013.01); *H04M 1/7246* (2021.01); *E04F 15/04* (2013.01); *E04F 2201/0138* (2013.01); *E04F 2201/0146* (2013.01); *E04F 2201/0153* (2013.01); *E04F 2201/0161* (2013.01); *E04F 2201/0169* (2013.01); *E04F 2201/0176* (2013.01); *E04F 2201/022* (2013.01); *E04F 2201/026* (2013.01); *E04F 2201/041* (2013.01); *H04M 1/0264* (2013.01); *H04M 1/04* (2013.01); *H04M 1/21* (2013.01)

(58) Field of Classification Search
CPC ........ E04F 15/02005; E04F 2201/0153; E04F 2201/0115; E04F 2201/0138; E04F 2201/0523; E04F 2201/0146; E04F 2201/05; E04F 2201/0161; E04F 13/0894; E04B 5/00; E04B 5/023
See application file for complete search history.

(56) References Cited

U.S. PATENT DOCUMENTS

| | | |
|---|---|---|
| 634,581 A | 10/1899 | Miller |
| 753,791 A | 3/1904 | Fulghum |
| 1,194,636 A | 8/1916 | Joy |
| 1,581,345 A | 4/1926 | Healy |
| 1,723,306 A | 8/1929 | Sipe |
| 1,743,492 A | 1/1930 | Sipe |
| 1,809,393 A | 6/1931 | Rockwell |
| 1,902,716 A | 3/1933 | Newton |
| 2,026,511 A | 12/1935 | Storm |
| 2,204,675 A | 6/1940 | Grunert |
| 2,277,758 A | 3/1942 | Hawkins |
| 2,596,280 A | 5/1952 | Nystrom |
| 2,732,706 A | 1/1956 | Friedman |
| 2,740,167 A | 4/1956 | Rowley |
| 2,863,185 A | 12/1958 | Riedi |
| 2,865,058 A | 12/1958 | Ake et al. |
| 2,889,016 A | 6/1959 | Warren |
| 3,023,681 A | 3/1962 | Worson |
| 3,077,703 A | 2/1963 | Bergstrom |
| 3,147,522 A | 9/1964 | Schumm |
| 3,271,787 A | 9/1966 | Clary |
| 3,325,585 A | 6/1967 | Brenneman |
| 3,378,958 A | 4/1968 | Parks et al. |
| 3,396,640 A | 8/1968 | Fujihara |
| 3,512,324 A | 5/1970 | Reed |
| 3,517,927 A | 6/1970 | Kennel |
| 3,526,071 A | 9/1970 | Watanabe |
| 3,535,844 A | 10/1970 | Glaros |
| 3,572,224 A | 3/1971 | Perry |
| 3,579,941 A | 5/1971 | Tibbals |
| 3,619,961 A | 11/1971 | Sterrett et al. |
| 3,720,027 A | 3/1973 | Christensen |
| 3,722,379 A | 3/1973 | Koester |
| 3,742,669 A | 7/1973 | Mansfeld |
| 3,760,547 A | 9/1973 | Brenneman |
| 3,760,548 A | 9/1973 | Sauer et al. |
| 3,778,954 A | 12/1973 | Meserole |
| 3,849,235 A | 11/1974 | Gwynne |
| 3,889,736 A | 6/1975 | Firks |
| 3,919,820 A | 11/1975 | Green |
| 3,950,915 A | 4/1976 | Cole |
| 3,998,015 A | 12/1976 | Scott et al. |
| 4,007,994 A | 2/1977 | Brown |
| 4,030,852 A | 6/1977 | Hein |
| 4,064,571 A | 12/1977 | Phipps |
| 4,080,086 A | 3/1978 | Steward |
| 4,082,129 A | 4/1978 | Morelock |
| 4,100,710 A | 7/1978 | Kowallik |
| 4,107,892 A | 8/1978 | Bellem |
| 4,113,399 A | 9/1978 | Hansen, Sr. |
| 4,123,885 A | 11/1978 | Scott |
| 4,169,688 A | 10/1979 | Toshio |
| 4,196,554 A | 4/1980 | Anderson et al. |
| 4,299,070 A | 11/1981 | Oltmanns et al. |
| 4,304,083 A | 12/1981 | Anderson |
| 4,426,820 A | 1/1984 | Terbrack et al. |
| 4,512,131 A | 4/1985 | Laramore |
| 4,599,841 A | 7/1986 | Haid |
| 4,648,165 A | 3/1987 | Whitehorne |
| 4,698,945 A | 10/1987 | Munn |
| 4,793,921 A | 12/1988 | Hauck et al. |
| 4,807,412 A | 2/1989 | Frederiksen |
| 4,953,341 A | 9/1990 | Joos |
| 5,007,222 A | 4/1991 | Raymond |
| 5,071,282 A | 12/1991 | Brown |
| 5,148,850 A | 9/1992 | Urbanick |
| 5,173,012 A | 12/1992 | Ortwein et al. |
| 5,182,892 A | 2/1993 | Chase |
| 5,247,773 A | 9/1993 | Weir |
| 5,272,850 A | 12/1993 | Mysliwiec et al. |
| 5,274,979 A | 1/1994 | Tsai |
| 5,344,700 A | 9/1994 | McGath et al. |
| 5,348,778 A | 9/1994 | Knipp et al. |
| 5,456,053 A | 10/1995 | Fischer |
| 5,465,546 A | 11/1995 | Buse |
| 5,548,937 A | 8/1996 | Shimonohara |
| 5,598,682 A | 2/1997 | Haughian |
| 5,616,389 A | 4/1997 | Blatz |
| 5,618,602 A | 4/1997 | Nelson |
| 5,630,304 A | 5/1997 | Austin |
| 5,634,309 A | 6/1997 | Polen |
| 5,658,086 A | 8/1997 | Brokaw et al. |
| 5,694,730 A | 12/1997 | Del et al. |
| 5,706,621 A * | 1/1998 | Pervan .................... E04F 15/02 52/480 |
| 5,735,097 A | 4/1998 | Cheyne |
| 5,755,068 A | 5/1998 | Ormiston |
| 5,797,237 A | 8/1998 | Finkell, Jr. |
| 5,845,548 A | 12/1998 | Nelson |
| 5,899,038 A | 5/1999 | Stroppiana |
| 5,950,389 A | 9/1999 | Porter |
| 5,970,675 A | 10/1999 | Schray |
| 6,006,486 A * | 12/1999 | Moriau ............. E04F 15/02038 52/592.1 |
| 6,052,960 A | 4/2000 | Yonemura |
| 6,065,262 A | 5/2000 | Motta |

(56) References Cited

U.S. PATENT DOCUMENTS

| | | |
|---|---|---|
| 6,101,778 A | 8/2000 | Maartensson |
| 6,139,945 A | 10/2000 | Krejchi et al. |
| 6,173,548 B1 | 1/2001 | Hamar et al. |
| 6,182,410 B1 | 2/2001 | Pervan |
| 6,209,278 B1 | 4/2001 | Tychsen |
| 6,216,409 B1 | 4/2001 | Roy et al. |
| 6,233,899 B1 | 5/2001 | Mellert et al. |
| 6,314,701 B1 | 11/2001 | Meyerson |
| 6,324,809 B1 | 12/2001 | Nelson |
| 6,332,733 B1 | 12/2001 | Hamberger et al. |
| 6,345,481 B1 | 2/2002 | Nelson |
| 6,363,677 B1 | 4/2002 | Chen et al. |
| 6,385,936 B1 | 5/2002 | Schneider |
| 6,418,683 B1 | 7/2002 | Martensson et al. |
| 6,446,405 B1 | 9/2002 | Pervan |
| 6,446,413 B1 | 9/2002 | Gruber |
| 6,490,836 B1 | 12/2002 | Moriau et al. |
| 6,505,452 B1 | 1/2003 | Hannig et al. |
| 6,546,691 B2 | 4/2003 | Leopolder |
| 6,553,724 B1 | 4/2003 | Bigler |
| 6,591,568 B1 | 7/2003 | Paalsson |
| 6,601,359 B2 | 8/2003 | Olofsson |
| 6,617,009 B1 | 9/2003 | Chen et al. |
| 6,647,689 B2 | 11/2003 | Pletzer et al. |
| 6,647,690 B1 | 11/2003 | Martensson |
| 6,651,400 B1 | 11/2003 | Murphy |
| 6,672,030 B2 | 1/2004 | Schulte |
| 6,685,391 B1 | 2/2004 | Gideon |
| 6,715,253 B2 | 4/2004 | Pervan |
| 6,763,643 B1 | 7/2004 | Maartensson |
| 6,766,622 B1 | 7/2004 | Thiers |
| 6,769,218 B2 | 8/2004 | Pervan |
| 6,769,219 B2 | 8/2004 | Schwitte et al. |
| 6,769,835 B2 | 8/2004 | Stridsman |
| 6,772,568 B2 | 8/2004 | Thiers et al. |
| 6,804,926 B1 | 10/2004 | Eisermann |
| 6,808,777 B2 | 10/2004 | Andersson et al. |
| 6,851,241 B2 | 2/2005 | Pervan |
| 6,854,235 B2 | 2/2005 | Martensson |
| 6,862,857 B2 | 3/2005 | Tychsen |
| 6,865,855 B2 | 3/2005 | Knauseder |
| 6,874,291 B1 | 4/2005 | Weber |
| 6,880,307 B2 | 4/2005 | Schwitte et al. |
| 6,918,220 B2 | 7/2005 | Pervan |
| 6,948,716 B2 | 9/2005 | Drouin |
| 6,968,664 B2 | 11/2005 | Thiers et al. |
| 7,021,019 B2 | 4/2006 | Knauseder |
| 7,040,068 B2 | 5/2006 | Moriau et al. |
| 7,051,486 B2 | 5/2006 | Pervan |
| 7,081,300 B2 | 7/2006 | Laurence et al. |
| 7,090,430 B1 | 8/2006 | Fletcher et al. |
| 7,121,058 B2 | 10/2006 | Palsson et al. |
| 7,127,860 B2 | 10/2006 | Pervan et al. |
| 7,152,383 B1 | 12/2006 | Wilkinson et al. |
| 7,171,791 B2 | 2/2007 | Pervan |
| 7,188,456 B2 | 3/2007 | Knauseder |
| 7,219,392 B2 | 5/2007 | Mullet et al. |
| 7,251,916 B2 | 8/2007 | Konzelmann et al. |
| 7,257,926 B1 | 8/2007 | Kirby |
| 7,337,588 B1 | 3/2008 | Moebus |
| 7,377,081 B2 | 5/2008 | Ruhdorfer |
| 7,451,578 B2 | 11/2008 | Hannig |
| 7,454,875 B2 | 11/2008 | Pervan et al. |
| 7,484,337 B2 | 2/2009 | Hecht |
| 7,484,338 B2 | 2/2009 | Pervan et al. |
| 7,516,588 B2 | 4/2009 | Pervan |
| 7,533,500 B2 | 5/2009 | Morton et al. |
| 7,550,192 B2 | 6/2009 | Dempsey et al. |
| 7,556,849 B2 | 7/2009 | Thompson et al. |
| 7,568,322 B2 | 8/2009 | Pervan |
| 7,584,583 B2 | 9/2009 | Bergelin et al. |
| 7,614,197 B2 | 11/2009 | Nelson |
| 7,617,651 B2 | 11/2009 | Grafenauer |
| 7,621,092 B2 | 11/2009 | Groeke et al. |
| 7,634,884 B2 | 12/2009 | Pervan et al. |
| 7,637,068 B2 | 12/2009 | Pervan |
| 7,641,963 B2 | 1/2010 | Grafenauer |
| 7,654,055 B2 | 2/2010 | Ricker |
| 7,677,005 B2 | 3/2010 | Pervan |
| 7,678,215 B2 | 3/2010 | Martin et al. |
| 7,716,896 B2 | 5/2010 | Pervan |
| 7,721,503 B2 | 5/2010 | Pervan et al. |
| 7,726,088 B2 | 6/2010 | Muehlebach |
| 7,739,849 B2 | 6/2010 | Pervan |
| 7,757,452 B2 | 7/2010 | Pervan |
| 7,779,597 B2 | 8/2010 | Thiers et al. |
| 7,793,471 B2 | 9/2010 | Hill |
| 7,802,411 B2 | 9/2010 | Pervan et al. |
| 7,806,624 B2 | 10/2010 | McLean et al. |
| 7,832,161 B2 | 11/2010 | Ligabue |
| 7,841,144 B2 | 11/2010 | Pervan |
| 7,841,145 B2 | 11/2010 | Pervan et al. |
| 7,841,150 B2 | 11/2010 | Pervan |
| 7,856,784 B2 | 12/2010 | Martensson |
| 7,856,789 B2 | 12/2010 | Eisermann |
| 7,861,482 B2 | 1/2011 | Pervan et al. |
| 7,866,110 B2 | 1/2011 | Pervan |
| 7,874,118 B2 | 1/2011 | Schitter |
| 7,886,497 B2 | 2/2011 | Pervan |
| 7,886,785 B2 | 2/2011 | Young |
| 7,896,571 B1 | 3/2011 | Hannig et al. |
| 7,900,416 B1 | 3/2011 | Yokubison et al. |
| 7,908,815 B2 | 3/2011 | Pervan et al. |
| 7,908,816 B2 | 3/2011 | Grafenauer et al. |
| 7,930,862 B2 | 4/2011 | Bergelin et al. |
| 7,958,689 B2 | 6/2011 | Lei |
| 7,980,039 B2 | 7/2011 | Groeke et al. |
| 7,980,041 B2 | 7/2011 | Pervan et al. |
| 7,984,600 B2 | 7/2011 | Alford et al. |
| 8,011,163 B2 | 9/2011 | Bazzano |
| 8,021,741 B2 | 9/2011 | Chen et al. |
| 8,033,074 B2 | 10/2011 | Pervan et al. |
| 8,038,363 B2 | 10/2011 | Hannig et al. |
| 8,042,311 B2 | 10/2011 | Pervan et al. |
| 8,061,104 B2 | 11/2011 | Pervan |
| 8,071,193 B2 | 12/2011 | Windmoeller |
| 8,079,196 B2 | 12/2011 | Pervan |
| 8,091,238 B2 | 1/2012 | Hannig |
| 8,112,967 B2 | 2/2012 | Pervan et al. |
| 8,122,670 B2 | 2/2012 | Matthee |
| 8,171,692 B2 | 5/2012 | Pervan |
| 8,181,416 B2 | 5/2012 | Pervan et al. |
| 8,220,217 B2 | 7/2012 | Muehlebach |
| 8,234,829 B2 | 8/2012 | Thiers et al. |
| 8,234,830 B2 | 8/2012 | Pervan et al. |
| 8,281,549 B2 | 10/2012 | Du |
| 8,302,361 B2 | 11/2012 | Braun et al. |
| 8,302,367 B2 | 11/2012 | Schulte |
| 8,341,914 B2 | 1/2013 | Pervan et al. |
| 8,341,915 B2 | 1/2013 | Pervan et al. |
| 8,353,140 B2 | 1/2013 | Pervan et al. |
| 8,356,452 B2 | 1/2013 | Thiers et al. |
| 8,359,805 B2 | 1/2013 | Pervan et al. |
| 8,365,499 B2 | 2/2013 | Nilsson et al. |
| 8,381,477 B2 | 2/2013 | Pervan et al. |
| 8,387,327 B2 | 3/2013 | Pervan |
| 8,438,814 B2 | 5/2013 | Thiers et al. |
| 8,448,402 B2 | 5/2013 | Pervan et al. |
| 8,499,521 B2 | 8/2013 | Pervan et al. |
| 8,505,257 B2 | 8/2013 | Boo et al. |
| 8,511,040 B2 | 8/2013 | Braun et al. |
| 8,528,289 B2 | 9/2013 | Pervan et al. |
| 8,544,230 B2 | 10/2013 | Pervan |
| 8,544,234 B2 | 10/2013 | Pervan et al. |
| 8,572,922 B2 | 11/2013 | Pervan |
| 8,596,013 B2 | 12/2013 | Boo |
| 8,627,862 B2 | 1/2014 | Pervan et al. |
| 8,640,424 B2 | 2/2014 | Pervan et al. |
| 8,650,826 B2 | 2/2014 | Pervan et al. |
| 8,658,274 B2 | 2/2014 | Chen et al. |
| 8,677,714 B2 | 3/2014 | Pervan |
| 8,689,512 B2 | 4/2014 | Pervan |
| 8,707,650 B2 | 4/2014 | Pervan et al. |
| 8,713,886 B2 | 5/2014 | Pervan et al. |

(56) References Cited

U.S. PATENT DOCUMENTS

| | | |
|---|---|---|
| 8,733,065 B2 | 5/2014 | Pervan |
| 8,733,410 B2 | 5/2014 | Pervan |
| 8,756,899 B2 | 6/2014 | Nilsson et al. |
| 8,763,341 B2 | 7/2014 | Pervan |
| 8,769,905 B2 | 7/2014 | Pervan et al. |
| 8,776,473 B2 | 7/2014 | Pervan et al. |
| 8,806,832 B2 | 8/2014 | Kell |
| 8,844,236 B2 | 9/2014 | Pervan et al. |
| 8,857,126 B2 | 10/2014 | Pervan et al. |
| 8,863,473 B2 | 10/2014 | Weber |
| 8,869,485 B2 | 10/2014 | Pervan |
| 8,898,988 B2 | 12/2014 | Pervan |
| 8,925,274 B2 | 1/2015 | Darko et al. |
| 8,959,866 B2 | 2/2015 | Pervan |
| 8,973,331 B2 | 3/2015 | Boo |
| 9,027,306 B2 | 5/2015 | Pervan |
| 9,051,738 B2 | 6/2015 | Pervan et al. |
| 9,068,360 B2 | 6/2015 | Pervan |
| 9,091,077 B2 | 7/2015 | Boo |
| 9,103,126 B2 | 8/2015 | Kell |
| 9,194,134 B2 | 11/2015 | Nygren et al. |
| 9,212,492 B2 | 12/2015 | Pervan et al. |
| 9,216,541 B2 | 12/2015 | Boo et al. |
| 9,238,917 B2 | 1/2016 | Pervan et al. |
| 9,249,581 B2 | 2/2016 | Nilsson et al. |
| 9,260,870 B2 | 2/2016 | Vermeulen et al. |
| 9,284,737 B2 | 3/2016 | Pervan et al. |
| 9,309,679 B2 | 4/2016 | Pervan et al. |
| 9,316,002 B2 | 4/2016 | Boo |
| 9,322,162 B2 | 4/2016 | Olofsson et al. |
| 9,340,974 B2 | 5/2016 | Pervan et al. |
| 9,347,469 B2 | 5/2016 | Pervan et al. |
| 9,359,774 B2 | 6/2016 | Pervan |
| 9,366,036 B2 | 6/2016 | Pervan |
| 9,376,821 B2 | 6/2016 | Pervan et al. |
| 9,382,716 B2 | 7/2016 | Pervan et al. |
| 9,388,584 B2 | 7/2016 | Pervan et al. |
| 9,428,919 B2 | 8/2016 | Pervan et al. |
| 9,453,347 B2 | 9/2016 | Pervan |
| 9,458,634 B2 | 10/2016 | Derelov |
| 9,482,012 B2 | 11/2016 | Nygren et al. |
| 9,540,826 B2 | 1/2017 | Pervan et al. |
| 9,663,940 B2 | 5/2017 | Boo |
| 9,725,912 B2 | 8/2017 | Pervan |
| 9,771,723 B2 | 9/2017 | Pervan |
| 9,777,487 B2 | 10/2017 | Pervan et al. |
| 9,803,374 B2 | 10/2017 | Pervan |
| 9,803,375 B2 | 10/2017 | Pervan |
| 9,856,656 B2 | 1/2018 | Pervan |
| 9,856,657 B2 | 1/2018 | Thiers et al. |
| 9,874,027 B2 | 1/2018 | Pervan et al. |
| 9,945,130 B2 | 4/2018 | Nygren et al. |
| 9,951,526 B2 | 4/2018 | Boo et al. |
| 10,000,935 B2 | 6/2018 | Kell |
| 10,006,210 B2 | 6/2018 | Pervan et al. |
| 10,017,948 B2 | 7/2018 | Boo |
| 10,047,527 B2 | 8/2018 | Nilsson et al. |
| 10,113,319 B2 | 10/2018 | Pervan |
| 10,125,488 B2 | 11/2018 | Boo |
| 10,138,636 B2 | 11/2018 | Pervan |
| 10,161,139 B2 | 12/2018 | Pervan |
| 10,180,005 B2 | 1/2019 | Pervan et al. |
| 10,214,915 B2 | 2/2019 | Pervan et al. |
| 10,214,917 B2 | 2/2019 | Pervan et al. |
| 10,240,348 B2 | 3/2019 | Pervan et al. |
| 10,240,349 B2 | 3/2019 | Pervan et al. |
| 10,246,883 B2 | 4/2019 | Derelov |
| 10,352,049 B2 | 7/2019 | Boo |
| 10,358,830 B2 | 7/2019 | Pervan |
| 10,378,217 B2 | 8/2019 | Pervan |
| 10,458,125 B2 | 10/2019 | Pervan |
| 10,480,196 B2 | 11/2019 | Boo |
| 10,519,676 B2 | 12/2019 | Pervan |
| 10,526,792 B2 | 1/2020 | Pervan et al. |
| 10,526,793 B2 | 1/2020 | Nilsson et al. |
| 10,538,922 B2 | 1/2020 | Pervan |
| 10,570,625 B2 | 2/2020 | Pervan |
| 10,640,989 B2 | 5/2020 | Pervan |
| 10,655,339 B2 | 5/2020 | Pervan |
| 10,669,723 B2 | 6/2020 | Pervan et al. |
| 10,724,251 B2 | 7/2020 | Kell |
| 10,731,358 B2 | 8/2020 | Pervan |
| 10,794,065 B2 | 10/2020 | Boo et al. |
| 10,828,798 B2 | 11/2020 | Fransson |
| 10,933,592 B2 | 3/2021 | Blomgren et al. |
| 10,934,721 B2 | 3/2021 | Pervan et al. |
| 10,953,566 B2 | 3/2021 | Fransson et al. |
| 10,968,639 B2 | 4/2021 | Pervan et al. |
| 10,975,577 B2 | 4/2021 | Pervan et al. |
| 10,995,501 B2 | 5/2021 | Pervan |
| 11,045,933 B2 | 6/2021 | Fransson et al. |
| 11,053,691 B2 | 7/2021 | Pervan |
| 11,053,692 B2 | 7/2021 | Pervan |
| 11,060,302 B2 | 7/2021 | Ylikangas et al. |
| 11,066,835 B2 | 7/2021 | Boo |
| 11,078,673 B2 | 8/2021 | Pervan et al. |
| 11,091,920 B2 | 8/2021 | Kell |
| 11,131,099 B2 | 9/2021 | Pervan |
| 11,174,646 B2 | 11/2021 | Pervan |
| 11,193,283 B2 | 12/2021 | Pervan et al. |
| 11,261,608 B2 | 3/2022 | Pervan |
| 11,274,453 B2 | 3/2022 | Pervan |
| 2002/0007608 A1 | 1/2002 | Pervan |
| 2002/0031646 A1 | 3/2002 | Chen et al. |
| 2002/0092263 A1 | 7/2002 | Schulte |
| 2002/0112433 A1 | 8/2002 | Pervan |
| 2002/0170258 A1 | 11/2002 | Schwitte et al. |
| 2002/0170259 A1 | 11/2002 | Ferris |
| 2002/0178674 A1 | 12/2002 | Pervan |
| 2002/0178680 A1 | 12/2002 | Martensson et al. |
| 2002/0178681 A1 | 12/2002 | Zancai et al. |
| 2002/0189183 A1 | 12/2002 | Ricciardelli |
| 2003/0009971 A1 | 1/2003 | Palmberg |
| 2003/0024199 A1 | 2/2003 | Pervan et al. |
| 2003/0037504 A1 | 2/2003 | Schwitte et al. |
| 2003/0084636 A1 | 5/2003 | Pervan |
| 2003/0094230 A1 | 5/2003 | Sjoberg |
| 2003/0101674 A1 | 6/2003 | Pervan et al. |
| 2003/0101681 A1 | 6/2003 | Tychsen |
| 2003/0180091 A1 | 9/2003 | Stridsman |
| 2003/0188504 A1 | 10/2003 | Ralf |
| 2003/0196405 A1 | 10/2003 | Pervan |
| 2004/0016196 A1 | 1/2004 | Pervan |
| 2004/0031227 A1 | 2/2004 | Knauseder |
| 2004/0049999 A1 | 3/2004 | Krieger |
| 2004/0060255 A1 | 4/2004 | Knauseder |
| 2004/0068954 A1 | 4/2004 | Martensson |
| 2004/0123548 A1 | 7/2004 | Gimpel et al. |
| 2004/0128934 A1 | 7/2004 | Hecht |
| 2004/0139676 A1 | 7/2004 | Knauseder |
| 2004/0139678 A1 | 7/2004 | Pervan |
| 2004/0168392 A1 | 9/2004 | Konzelmann et al. |
| 2004/0182033 A1 | 9/2004 | Wernersson |
| 2004/0182036 A1 | 9/2004 | Sjoberg et al. |
| 2004/0200175 A1 | 10/2004 | Weber |
| 2004/0211143 A1 | 10/2004 | Hanning |
| 2004/0235721 A1 | 11/2004 | Weber et al. |
| 2004/0250492 A1 | 12/2004 | Becker |
| 2004/0261348 A1 | 12/2004 | Vulin |
| 2005/0050827 A1 | 3/2005 | Schitter |
| 2005/0102937 A1 | 5/2005 | Pervan |
| 2005/0160694 A1 | 7/2005 | Pervan |
| 2005/0166514 A1 | 8/2005 | Pervan |
| 2005/0210810 A1 | 9/2005 | Pervan |
| 2005/0235593 A1 | 10/2005 | Hecht |
| 2005/0252130 A1 | 11/2005 | Martensson |
| 2006/0064940 A1 | 3/2006 | Cappelle |
| 2006/0070333 A1 | 4/2006 | Pervan |
| 2006/0075713 A1 | 4/2006 | Pervan et al. |
| 2006/0101769 A1 | 5/2006 | Pervan et al. |
| 2006/0101773 A1 | 5/2006 | Turner et al. |
| 2006/0156666 A1 | 7/2006 | Caufield |
| 2006/0156670 A1 | 7/2006 | Knauseder |
| 2006/0196139 A1 | 9/2006 | Pervan et al. |

(56) References Cited

U.S. PATENT DOCUMENTS

| | | |
|---|---|---|
| 2006/0236642 A1 | 10/2006 | Pervan |
| 2006/0260254 A1 | 11/2006 | Pervan |
| 2007/0006543 A1 | 1/2007 | Engstrom |
| 2007/0011981 A1 | 1/2007 | Eisermann |
| 2007/0028547 A1 | 2/2007 | Grafenauer et al. |
| 2007/0062148 A1 | 3/2007 | Nienhuis et al. |
| 2007/0065293 A1 | 3/2007 | Hannig |
| 2007/0108679 A1 | 5/2007 | Grothaus |
| 2007/0130872 A1 | 6/2007 | Goodwin et al. |
| 2007/0151189 A1 | 7/2007 | Yang |
| 2007/0175156 A1 | 8/2007 | Pervan et al. |
| 2007/0193178 A1 | 8/2007 | Groeke et al. |
| 2007/0209736 A1 | 9/2007 | Deringor et al. |
| 2008/0000185 A1 | 1/2008 | Duernberger |
| 2008/0000186 A1 | 1/2008 | Pervan et al. |
| 2008/0000187 A1 | 1/2008 | Pervan |
| 2008/0000194 A1 | 1/2008 | Pervan et al. |
| 2008/0010931 A1 | 1/2008 | Pervan et al. |
| 2008/0010937 A1 | 1/2008 | Pervan et al. |
| 2008/0028707 A1 | 2/2008 | Pervan |
| 2008/0028713 A1 | 2/2008 | Pervan et al. |
| 2008/0029490 A1 | 2/2008 | Martin et al. |
| 2008/0034708 A1 | 2/2008 | Pervan |
| 2008/0041008 A1 | 2/2008 | Pervan |
| 2008/0060308 A1 | 3/2008 | Pervan |
| 2008/0066415 A1 | 3/2008 | Pervan et al. |
| 2008/0104921 A1 | 5/2008 | Pervan et al. |
| 2008/0110125 A1 | 5/2008 | Pervan |
| 2008/0134607 A1 | 6/2008 | Pervan et al. |
| 2008/0134613 A1 | 6/2008 | Pervan |
| 2008/0134614 A1 | 6/2008 | Pervan et al. |
| 2008/0138560 A1 | 6/2008 | Windmoller |
| 2008/0141610 A1 | 6/2008 | Thiers et al. |
| 2008/0155930 A1 | 7/2008 | Pervan et al. |
| 2008/0168730 A1 | 7/2008 | Pervan et al. |
| 2008/0184646 A1 | 8/2008 | Alford et al. |
| 2008/0216434 A1 | 9/2008 | Pervan |
| 2008/0216920 A1 | 9/2008 | Pervan |
| 2008/0236088 A1 | 10/2008 | Hannig |
| 2008/0241440 A1 | 10/2008 | Bauer |
| 2008/0271403 A1 | 11/2008 | Palsson et al. |
| 2008/0295432 A1 | 12/2008 | Pervan et al. |
| 2009/0019808 A1 | 1/2009 | Palsson et al. |
| 2009/0038253 A1 | 2/2009 | Martensson |
| 2009/0049787 A1 | 2/2009 | Hannig |
| 2009/0049792 A1 | 2/2009 | Cappelle et al. |
| 2009/0100782 A1 | 4/2009 | Groeke et al. |
| 2009/0133353 A1 | 5/2009 | Pervan et al. |
| 2009/0151290 A1 | 6/2009 | Liu |
| 2009/0193741 A1 | 8/2009 | Cappelle |
| 2009/0193748 A1 | 8/2009 | Boo et al. |
| 2009/0193753 A1 | 8/2009 | Schitter |
| 2009/0249733 A1 | 10/2009 | Moebus |
| 2009/0308014 A1 | 12/2009 | Muehlebach |
| 2010/0031594 A1 | 2/2010 | Liu et al. |
| 2010/0043333 A1 | 2/2010 | Hannig |
| 2010/0058590 A1 | 3/2010 | Braun et al. |
| 2010/0083603 A1 | 4/2010 | Goodwin |
| 2010/0218450 A1 | 9/2010 | Braun et al. |
| 2010/0229491 A1 | 9/2010 | Pervan |
| 2010/0257809 A1 | 10/2010 | Thiers et al. |
| 2010/0293879 A1 | 11/2010 | Pervan et al. |
| 2010/0300029 A1 | 12/2010 | Braun et al. |
| 2010/0300031 A1 | 12/2010 | Pervan et al. |
| 2010/0319290 A1 | 12/2010 | Pervan et al. |
| 2010/0319291 A1 | 12/2010 | Pervan et al. |
| 2011/0023303 A1 | 2/2011 | Pervan et al. |
| 2011/0030303 A1 | 2/2011 | Pervan et al. |
| 2011/0041996 A1 | 2/2011 | Pervan |
| 2011/0056167 A1 | 3/2011 | Nilsson |
| 2011/0088344 A1 | 4/2011 | Pervan et al. |
| 2011/0088345 A1 | 4/2011 | Pervan |
| 2011/0154763 A1 | 6/2011 | Bergelin et al. |
| 2011/0167750 A1 | 7/2011 | Pervan |
| 2011/0167751 A1 | 7/2011 | Engstrom |
| 2011/0225921 A1 | 9/2011 | Schulte |
| 2011/0225922 A1 | 9/2011 | Pervan et al. |
| 2011/0252733 A1 | 10/2011 | Pervan et al. |
| 2011/0283650 A1 | 11/2011 | Pervan et al. |
| 2011/0296780 A1 | 12/2011 | Windmoeller |
| 2012/0017533 A1 | 1/2012 | Pervan et al. |
| 2012/0031029 A1 | 2/2012 | Pervan et al. |
| 2012/0036804 A1 | 2/2012 | Pervan |
| 2012/0096801 A1 | 4/2012 | Cappelle |
| 2012/0124932 A1 | 5/2012 | Schulte et al. |
| 2012/0151865 A1 | 6/2012 | Pervan et al. |
| 2012/0174515 A1 | 7/2012 | Pervan et al. |
| 2012/0174520 A1 | 7/2012 | Pervan |
| 2012/0174521 A1 | 7/2012 | Schulte |
| 2012/0216472 A1 | 8/2012 | Martensson et al. |
| 2012/0279161 A1 | 11/2012 | Hakansson et al. |
| 2013/0008117 A1 | 1/2013 | Pervan |
| 2013/0008127 A1 | 1/2013 | Braun et al. |
| 2013/0014463 A1 | 1/2013 | Pervan |
| 2013/0019555 A1 | 1/2013 | Pervan et al. |
| 2013/0042562 A1 | 2/2013 | Pervan et al. |
| 2013/0042563 A1 | 2/2013 | Pervan et al. |
| 2013/0042564 A1 | 2/2013 | Pervan et al. |
| 2013/0042565 A1 | 2/2013 | Pervan et al. |
| 2013/0047536 A1 | 2/2013 | Pervan |
| 2013/0081349 A1 | 4/2013 | Pervan et al. |
| 2013/0111758 A1 | 5/2013 | Nilsson et al. |
| 2013/0111845 A1 | 5/2013 | Pervan et al. |
| 2013/0145708 A1 | 6/2013 | Pervan |
| 2013/0160391 A1 | 6/2013 | Pervan et al. |
| 2013/0232905 A2 | 9/2013 | Pervan |
| 2013/0239508 A1 | 9/2013 | Darko et al. |
| 2013/0247501 A1 | 9/2013 | Thiers et al. |
| 2013/0263454 A1 | 10/2013 | Boo et al. |
| 2013/0263547 A1 | 10/2013 | Boo |
| 2013/0318906 A1 | 12/2013 | Pervan et al. |
| 2013/0333182 A1 | 12/2013 | Pervan et al. |
| 2014/0007539 A1 | 1/2014 | Pervan et al. |
| 2014/0020324 A1 | 1/2014 | Pervan |
| 2014/0033633 A1 | 2/2014 | Kell |
| 2014/0033634 A1 | 2/2014 | Pervan |
| 2014/0053497 A1 | 2/2014 | Pervan et al. |
| 2014/0059966 A1 | 3/2014 | Boo |
| 2014/0069043 A1 | 3/2014 | Pervan |
| 2014/0090331 A1 | 4/2014 | Pervan et al. |
| 2014/0090335 A1 | 4/2014 | Pervan et al. |
| 2014/0109501 A1 | 4/2014 | Pervan |
| 2014/0109506 A1 | 4/2014 | Pervan et al. |
| 2014/0123586 A1 | 5/2014 | Pervan et al. |
| 2014/0190112 A1 | 7/2014 | Pervan et al. |
| 2014/0208677 A1 | 7/2014 | Pervan et al. |
| 2014/0223852 A1 | 8/2014 | Pervan |
| 2014/0237924 A1 | 8/2014 | Nilsson et al. |
| 2014/0237931 A1 | 8/2014 | Pervan |
| 2014/0250813 A1 | 9/2014 | Nygren et al. |
| 2014/0260060 A1 | 9/2014 | Pervan et al. |
| 2014/0305065 A1 | 10/2014 | Pervan |
| 2014/0366476 A1 | 12/2014 | Pervan et al. |
| 2014/0366477 A1 | 12/2014 | Kell |
| 2014/0373478 A2 | 12/2014 | Pervan et al. |
| 2014/0373480 A1 | 12/2014 | Pervan et al. |
| 2015/0000221 A1 | 1/2015 | Boo |
| 2015/0013260 A1 | 1/2015 | Pervan |
| 2015/0059281 A1 | 3/2015 | Pervan |
| 2015/0089896 A2 | 4/2015 | Pervan et al. |
| 2015/0121796 A1 | 5/2015 | Pervan |
| 2015/0152644 A1 | 6/2015 | Boo |
| 2015/0167318 A1 | 6/2015 | Pervan |
| 2015/0211239 A1 | 7/2015 | Pervan |
| 2015/0233125 A1 | 8/2015 | Pervan et al. |
| 2015/0267419 A1 | 9/2015 | Pervan |
| 2015/0300029 A1 | 10/2015 | Pervan |
| 2015/0330088 A1 | 11/2015 | Derelov |
| 2015/0337537 A1 | 11/2015 | Boo |
| 2015/0368910 A1 | 12/2015 | Kell |
| 2016/0032596 A1 | 2/2016 | Nygren et al. |
| 2016/0060879 A1 | 3/2016 | Pervan |
| 2016/0069088 A1 | 3/2016 | Boo et al. |
| 2016/0076260 A1 | 3/2016 | Pervan et al. |

(56) References Cited

U.S. PATENT DOCUMENTS

| | | |
|---|---|---|
| 2016/0090744 A1 | 3/2016 | Pervan et al. |
| 2016/0108624 A1 | 4/2016 | Nilsson et al. |
| 2016/0153200 A1 | 6/2016 | Pervan |
| 2016/0168866 A1 | 6/2016 | Pervan et al. |
| 2016/0186426 A1 | 6/2016 | Boo |
| 2016/0194884 A1 | 7/2016 | Pervan et al. |
| 2016/0201336 A1 | 7/2016 | Pervan |
| 2016/0251859 A1 | 9/2016 | Pervan et al. |
| 2016/0251860 A1 | 9/2016 | Pervan |
| 2016/0281368 A1 | 9/2016 | Pervan et al. |
| 2016/0281370 A1 | 9/2016 | Pervan et al. |
| 2016/0326751 A1 | 11/2016 | Pervan |
| 2016/0340913 A1 | 11/2016 | Derelov |
| 2017/0037641 A1 | 2/2017 | Nygren et al. |
| 2017/0081860 A1 | 3/2017 | Boo |
| 2017/0254096 A1 | 9/2017 | Pervan |
| 2017/0321433 A1 | 11/2017 | Pervan et al. |
| 2017/0362834 A1 | 12/2017 | Pervan et al. |
| 2018/0001509 A1 | 1/2018 | Myllykangas et al. |
| 2018/0001510 A1 | 1/2018 | Fransson |
| 2018/0001573 A1 | 1/2018 | Blomgren et al. |
| 2018/0002933 A1 | 1/2018 | Pervan |
| 2018/0016783 A1 | 1/2018 | Boo |
| 2018/0030737 A1 | 2/2018 | Pervan |
| 2018/0030738 A1 | 2/2018 | Pervan |
| 2018/0094441 A1 | 4/2018 | Boo |
| 2018/0119431 A1 | 5/2018 | Pervan et al. |
| 2018/0178406 A1 | 6/2018 | Fransson et al. |
| 2018/0313093 A1 | 11/2018 | Nilsson et al. |
| 2019/0024387 A1 | 1/2019 | Pervan |
| 2019/0048592 A1 | 2/2019 | Boo |
| 2019/0048596 A1 | 2/2019 | Pervan |
| 2019/0063076 A1 | 2/2019 | Boo et al. |
| 2019/0093370 A1 | 3/2019 | Pervan et al. |
| 2019/0093371 A1 | 3/2019 | Pervan |
| 2019/0119928 A1 | 4/2019 | Pervan et al. |
| 2019/0127989 A1 | 5/2019 | Kell |
| 2019/0127990 A1 | 5/2019 | Pervan et al. |
| 2019/0169859 A1 | 6/2019 | Pervan et al. |
| 2019/0232473 A1 | 8/2019 | Fransson et al. |
| 2019/0271165 A1 | 9/2019 | Boo |
| 2019/0376298 A1 | 12/2019 | Pervan et al. |
| 2020/0087927 A1 | 3/2020 | Pervan |
| 2020/0102756 A1 | 4/2020 | Pervan |
| 2020/0109569 A1 | 4/2020 | Pervan |
| 2020/0149289 A1 | 5/2020 | Pervan |
| 2020/0173175 A1 | 6/2020 | Pervan |
| 2020/0224430 A1 | 7/2020 | Ylikangas et al. |
| 2020/0263437 A1 | 8/2020 | Pervan |
| 2020/0284045 A1 | 9/2020 | Kell |
| 2020/0318667 A1 | 10/2020 | Derelv |
| 2020/0354969 A1 | 11/2020 | Pervan et al. |
| 2020/0362567 A1 | 11/2020 | Nilsson et al. |
| 2021/0016465 A1 | 1/2021 | Fransson |
| 2021/0047840 A1 | 2/2021 | Pervan |
| 2021/0047841 A1 | 2/2021 | Pervan et al. |
| 2021/0071428 A1 | 3/2021 | Pervan |
| 2021/0087831 A1 | 3/2021 | Nilsson et al. |
| 2021/0087832 A1 | 3/2021 | Boo |
| 2021/0087833 A1 | 3/2021 | Ylikangas et al. |
| 2021/0087834 A1 | 3/2021 | Ylikangas et al. |
| 2021/0310257 A1 | 10/2021 | Boo |
| 2021/0348396 A1 | 11/2021 | Pervan et al. |
| 2021/0381255 A1 | 12/2021 | Ylikangas et al. |
| 2022/0025657 A1 | 1/2022 | Pervan |
| 2022/0025658 A1 | 1/2022 | Kell |

FOREIGN PATENT DOCUMENTS

| | | |
|---|---|---|
| CN | 1270263 A | 10/2000 |
| DE | 2516843 A1 | 10/1976 |
| DE | 3343601 A1 | 6/1985 |
| DE | 3932980 A1 | 11/1991 |
| DE | 19854475 A1 | 7/1999 |
| DE | 29922649 U1 | 3/2000 |
| DE | 19940837 A1 | 11/2000 |
| DE | 19958225 A1 | 6/2001 |
| DE | 20205774 U1 | 8/2002 |
| DE | 10305695 A1 | 9/2004 |
| DE | 20320799 U1 | 4/2005 |
| DE | 202005004537 U1 | 6/2005 |
| DE | 102004055951 A1 | 7/2005 |
| DE | 102004001363 A1 | 8/2005 |
| DE | 102005024366 A1 | 11/2006 |
| DE | 102005028072 A1 | 12/2006 |
| DE | 102006024184 A1 | 11/2007 |
| DE | 102006037614 B3 | 12/2007 |
| DE | 102006057491 A1 | 6/2008 |
| DE | 102006058655 A1 | 6/2008 |
| DE | 102007018309 A1 | 8/2008 |
| DE | 102007020271 A1 | 8/2008 |
| DE | 102007032885 A1 | 1/2009 |
| EP | 0013852 A1 | 8/1980 |
| EP | 0085196 A1 | 8/1983 |
| EP | 0170143 A2 | 2/1986 |
| EP | 0871156 A2 | 10/1998 |
| EP | 0974713 A1 | 1/2000 |
| EP | 1045083 A1 | 10/2000 |
| EP | 1120515 A1 | 8/2001 |
| EP | 1165906 A1 | 1/2002 |
| EP | 1308577 A2 | 5/2003 |
| EP | 1350904 A2 | 10/2003 |
| EP | 1396593 A2 | 3/2004 |
| EP | 1420125 A2 | 5/2004 |
| EP | 1437457 A2 | 7/2004 |
| EP | 1512808 A1 | 3/2005 |
| EP | 1570143 A1 | 9/2005 |
| EP | 1585875 A1 | 10/2005 |
| EP | 1640530 A2 | 3/2006 |
| EP | 1650375 A1 | 4/2006 |
| EP | 1938963 A1 | 7/2008 |
| EP | 1980683 A2 | 10/2008 |
| FR | 1138595 A | 6/1957 |
| FR | 1293043 A | 5/1962 |
| FR | 2256807 A1 | 8/1975 |
| FR | 2810060 A1 | 12/2001 |
| GB | 0240629 | 10/1925 |
| GB | 0376352 A | 7/1932 |
| GB | 1171337 A | 11/1969 |
| GB | 1430423 A | 3/1976 |
| GB | 2051916 A | 1/1981 |
| GB | 2436570 A | 10/2007 |
| JP | 03-110258 A | 5/1991 |
| JP | 06-288017 A | 10/1994 |
| JP | 06-306961 A | 11/1994 |
| JP | 06-322848 A | 11/1994 |
| JP | 07-180333 A | 7/1995 |
| JP | 07-300979 A | 11/1995 |
| JP | 3363976 B2 | 1/2003 |
| KR | 10-1996-0005785 A | 2/1996 |
| KR | 10-2008-0096189 A | 10/2008 |
| WO | 94/26999 A1 | 11/1994 |
| WO | 96/27721 A1 | 9/1996 |
| WO | 97/47834 A1 | 12/1997 |
| WO | 99/66151 A1 | 12/1999 |
| WO | 00/20705 A1 | 4/2000 |
| WO | 00/43281 A2 | 7/2000 |
| WO | 00/47841 A1 | 8/2000 |
| WO | 00/55067 A1 | 9/2000 |
| WO | 00/66856 A1 | 11/2000 |
| WO | 01/02669 A1 | 1/2001 |
| WO | 01/02670 A1 | 1/2001 |
| WO | 01/02671 A1 | 1/2001 |
| WO | 01/02672 A1 | 1/2001 |
| WO | 01/44669 A2 | 6/2001 |
| WO | 01/48331 A1 | 7/2001 |
| WO | 01/48332 A1 | 7/2001 |
| WO | 01/51732 A1 | 7/2001 |
| WO | 01/51733 A1 | 7/2001 |
| WO | 01/53628 A1 | 7/2001 |
| WO | 01/66877 A1 | 9/2001 |
| WO | 01/75247 A1 | 10/2001 |
| WO | 01/77461 A1 | 10/2001 |
| WO | 01/88306 A1 | 11/2001 |

(56) References Cited

FOREIGN PATENT DOCUMENTS

| | | |
|---|---|---|
| WO | 01/98603 A2 | 12/2001 |
| WO | 01/98604 A1 | 12/2001 |
| WO | 02/48127 A2 | 6/2002 |
| WO | 03/06654 A1 | 1/2003 |
| WO | 03/12224 A1 | 2/2003 |
| WO | 03/16654 A1 | 2/2003 |
| WO | 03/25307 A1 | 3/2003 |
| WO | 03/38210 A1 | 5/2003 |
| WO | 03/83234 A1 | 10/2003 |
| WO | 03/85222 A1 | 10/2003 |
| WO | 03/87497 A1 | 10/2003 |
| WO | 03/89736 A1 | 10/2003 |
| WO | 2004/016876 A2 | 2/2004 |
| WO | 2004/016877 A1 | 2/2004 |
| WO | 2004/020764 A1 | 3/2004 |
| WO | 2004/044348 A1 | 5/2004 |
| WO | 2004/053258 A1 | 6/2004 |
| WO | 2004/079130 A1 | 9/2004 |
| WO | 2004/083557 A1 | 9/2004 |
| WO | 2004/085765 A1 | 10/2004 |
| WO | 2005/003489 A1 | 1/2005 |
| WO | 2005/054599 A1 | 6/2005 |
| WO | 2006/043893 A1 | 4/2006 |
| WO | 2006/050928 A1 | 5/2006 |
| WO | 2006/104436 A1 | 10/2006 |
| WO | 2006/123988 A1 | 11/2006 |
| WO | 2006/133690 A1 | 12/2006 |
| WO | 2007/015669 A2 | 2/2007 |
| WO | 2007/020088 A1 | 2/2007 |
| WO | 2007/079845 A1 | 7/2007 |
| WO | 2007/089186 A1 | 8/2007 |
| WO | 2007/118352 A1 | 10/2007 |
| WO | 2007/142589 A1 | 12/2007 |
| WO | 2008/004960 A2 | 1/2008 |
| WO | 2008/008824 A1 | 1/2008 |
| WO | 2008/017281 A1 | 2/2008 |
| WO | 2008/017301 A2 | 2/2008 |
| WO | 2008/060232 A1 | 5/2008 |
| WO | 2007/141605 A3 | 6/2008 |
| WO | 2008/068245 A1 | 6/2008 |
| WO | 2008/116623 A1 | 10/2008 |
| WO | 2008/133377 A1 | 11/2008 |
| WO | 2009/116926 A1 | 9/2009 |
| WO | 2010/087752 A1 | 8/2010 |

OTHER PUBLICATIONS

Boo, Christian, et al., U.S. Appl. No. 13/855,979, entitled "Method for Producing a Mechanical Locking System for Building Panels," filed Apr. 3, 2013.

Boo, Christian, et al., U.S. Appl. No. 14/946,066, entitled "Method for Producing a Mechanical Locking System for Building Panels," filed Nov. 19, 2015.

Boo, Christian, et al., U.S. Appl. No. 15/923,475 entitled "Method for Producing a Mechanical Locking System for Building Panels," filed Mar. 16, 2018.

Boo, Christian, U.S. Appl. No. 13/855,966, entitled "Building Panel with a Mechanical Locking System," filed Apr. 3, 2013.

Boo, Christian, U.S. Appl. No. 17/030,923 entitled "Panel With Locking Device," filed Sep. 24, 2020.

Boo, Christian, U.S. Appl. No. 61/620,233, entitled "Building Panel with a Mechanical Locking System," filed Apr. 4, 2012., U.S. Appl. No. 61/620,233.

Boo, Christian, U.S. Appl. No. 61/620,246, entitled "Method for Producing a Mechanical Locking System for Building Panels," filed Apr. 4, 2012.

Decision to gran received for European Application No. 08847498. 6, dated Dec. 6, 2018, 2 pages.

European prosecution file history, European Patent No. 1863984 (Appln. No. 06700664), dated Oct. 5, 2006 to Sep. 9, 2010, 242 pages.

European Search Report and Search Opinion received for European Application No. 08847498.6, dated Nov. 7, 2017, 7 pages.

European Search Report and Search Opinion received for European Application No. 18211995.8, dated Apr. 12, 2019, 13 pages.

Intention to gran received for European Application No. 08847498. 6, dated Aug. 3, 2018, 6 pages.

International Preliminary Report on Patentability received for PCT Patent Application No. PCT/SE08/051276, dated May 11, 2010, 13 pages.

International Search Report and Written Opinion dated Mar. 9, 2009 in PCT/SE2008/0511276, Swedish Patent Office, Stockholm, Sweden, 21 pages.

International Search Report and Written Opinion received for PCT Patent Application No. PCT/SE2008/051276, dated Mar. 9, 2009, 19 pages.

Kell, Richard William, U.S. Appl. No. 15/977,210 entitled "Vertical Joint System and Associated Surface Covering System," filed May 11, 2018.

Kell, Richard William, U.S. Appl. No. 17/368,075 entitled "Vertical Joint System and Associated Surface Covering System," filed filed Jul. 6, 2021.

Nilsson et al., U.S. Appl. No. 17/694,843 entitled "Resilient Floor", filed Mar. 15, 2022.

Nilsson, Anders, et al., U.S. Appl. No. 17/029,658 entitled "Set of Panels," filed Sep. 23, 2020.

Nilsson, Mats, et al., U.S. Appl. No. 16/027,465 entitled "Resilient Floor," filed Jul. 5, 2018.

Nilsson, Mats, et al., U.S. Appl. No. 16/713,431 entitled "Resilient Floor," filed dated Dec. 13, 2019.

Notice of Allowance received for Chinese Patent Application No. 200880124150.6, dated Apr. 6, 2012, 3 pages (2 pages of English Translation and 1 page of Original Document).

Office Action received for Chinese Patent Application No. 200880124150.6, dated Oct. 10, 2011, 11 pages (6 pages of English Translation and 5 pages of Original Document).

Office Action received for European Patent Application No. 18211995. 8, dated Apr. 24, 2020, 6 pages.

Office Action received for European Patent Application No. 18211995. 8, dated Mar. 14, 2023, 6 pages.

Pervan Darko, U.S. Appl. No. 13/253,283, entitled "Mechanical Locking System for Floor Panels," filed Oct. 5, 2011.

Pervan, Darko, et al, U.S. Appl. No. 12/788,384, entitled "Mechanical Locking of Floor Panels With a Flexible Bristle Tongue," filed May 27, 2010.

Pervan, Darko, et al, U.S. Appl. No. 12/910,138, entitled "Mechanical Locking of Floor Panels With a Flexible Bristle Tongue," filed Oct. 22, 2010.

Pervan, Darko, et al., U.S. Appl. No. 12/868,137, entitled "Mechanical Locking System for Floor Panels," filed Aug. 25, 2010.

Pervan, Darko, et al., U.S. Appl. No. 12/518,584, entitled, "Mechanical Locking of Floor Panels," filed Jun. 10, 2009.

Pervan, Darko, et al., U.S. Appl. No. 12/865,136, entitled "Mechanical Locking of Floor Panels, Methods to Install and Uninstall Panels . . . ," filed Oct. 7, 2010.

Pervan, Darko, et al., U.S. Appl. No. 13/146,731, entitled "Mechanical Lockings of Floor Panels and a Tongue Blank," filed Jul. 28, 2011.

Pervan, Darko, et al., U.S. Appl. No. 13/158,776, entitled "Mechanical Locking system for Floor Panels," filed Jun. 13, 2011.

Pervan, Darko, et al., U.S. Appl. No. 13/195,297, entitled "Mechanical Locking of Floor Panels With a Flexible Bristle Tongue," filed Aug. 1, 2011.

Pervan, Darko, et al., U.S. Appl. No. 13/232,467, entitled "Mechanical Locking for Panels and Method of Installing Same," filed Sep. 14, 2011.

Pervan, Darko, et al., U.S. Appl. No. 13/329,019 entitled "Mechanical Locking of Panels," filed Dec. 16, 2011.

Pervan, Darko, et al., U.S. Appl. No. 13/426,115 entitled "Mechanical Locking System for Floor Panels," filed Mar. 21, 2012.

Pervan, Darko, et al., U.S. Appl. No. 13/546,569, entitled "Mechanical Locking System for Floor Panels," filed Jul. 11, 2012.

Pervan, Darko, et al., U.S. Appl. No. 13/577,042, entitled "Mechanical Locking System for Floor Panels," filed Aug. 3, 2012.

(56) References Cited

OTHER PUBLICATIONS

Pervan, Darko, et al., U.S. Appl. No. 13/585,179, entitled, "Mechanical Locking System for Floor Panels," filed Aug. 14, 2012.

Pervan, Darko, et al., U.S. Appl. No. 13/585,204, entitled "Mechanical Locking for Floor Panels," filed Aug. 14, 2012.

Pervan, Darko, et al., U.S. Appl. No. 13/585,485, entitled "Mechanical Locking System for Floor Panels," filed Aug. 14, 2012.

Pervan, Darko, et al., U.S. Appl. No. 13/596,988, entitled, "Mechanical Locking System for Floor Panels," filed Aug. 28, 2012.

Pervan, Darko, et al., U.S. Appl. No. 13/660,538, entitled "Mechanical Locking of Floor Panels with Vertical Snap Folding," filed Oct. 25, 2012.

Pervan, Darko, et al., U.S. Appl. No. 13/670,039, entitled "Mechanical Locking of Floor Panels with a Flexible Tongue," filed Nov. 6, 2012.

Pervan, Darko, et al., U.S. Appl. No. 13/728,121, entitled "Mechanical Locking of Floor Panels with a Flexible Tongue," filed Dec. 27, 2012.

Pervan, Darko, et al., U.S. Appl. No. 13/758,603, entitled "Mechanical Locking System for Panels and Method of Installing Same," filed Feb. 4, 2013.

Pervan, Darko, et al., U.S. Appl. No. 13/886,916, entitled "Mechanical Locking of Building Panels," filed May 3, 2013.

Pervan, Darko, et al., U.S. Appl. No. 16/708,719 entitled "Mechanical Locking System for Floor Panels," filed Dec. 10, 2019.

Pervan, Darko, U.S. Appl. No. 12/962,341, entitled "Mechanical Locking System for Panels and Method of Installing Same," filed Dec. 7, 2010.

Pervan, Darko, U.S. Appl. No. 13/540,107, entitled "Mechanical Locking of Floor Panels with a Glued Tongue," filed Jul. 2, 2012.

Pervan, Darko, U.S. Appl. No. 13/544,281, entitled "Mechanical Locking System for Floor Panels," filed Jul. 9, 2012.

Pervan, Darko, U.S. Appl. No. 14/973,179, entitled "Mechanical Locking System for Floor Panels," filed Dec. 17, 2015.

Pervan, Darko, U.S. Appl. No. 15/541,909, entitled "Mechanical Locking System for Floor Panels," filed Jul. 6, 2017.

Pervan, Darko, U.S. Appl. No. 15/726,754, entitled "Mechanical Locking System for Floor Panels," filed Oct. 6, 2017.

Pervan, et al., U.S. Appl. No. 12/741,751, entitled, "Mechanical Locking of Floor Panels With Vertical Snap Folding and an Installation Method to Connect Such Panels," filed May 6, 2010.

Pervan, U.S. Appl. No. 12/785,784, entitled "Locking System for Floorboards," filed May 24, 2010.

Plaintiff's First Amended Complaint and Counterclaim on Reply, *Akzenta Paneele + Profile GmbH and W. Classen GmbH & Co. KG v. Shaw Industries Group, Inc. and Valinge Innovation AB and Darko Pervan*, Nov. 30, 2010, 153 pages.

U.S. Appl. No. 14/982,608, filed Dec. 29, 2015, Mats Nilsson and Per Nygren (Cited herein as U.S. Patent Application Publication No. 2016/0108624 A1 of Apr. 21, 2016).

Valinge Innovation AB, Technical Disclosure entitled "Mechanical locking for floor panels with a flexible bristle tongue," IP.com No. IPCOM000145262D, Jan. 12, 2007, IP.com PriorArtDatabase, 57 pages.

Ylikangas, Roger, et al., U.S. Appl. No. 17/030,966 entitled "Panel With Locking Device," filed Sep. 24, 2020.

Ylikangas, Roger, et al., U.S. Appl. No. 17/031,166 entitled "Panel With Locking Device," filed Sep. 24, 2020.

U.S. Appl. No. 17/716,622, Anders Nilsson, filed Apr. 8, 2022.

U.S. Appl. No. 17/825,654, Roger Ylikangas, filed May 26, 2022.

U.S. Appl. No. 17/842,122, Christian Boo, filed Jun. 16, 2022.

U.S. Appl. No. 18/176,003, Richard William Kell, filed Feb. 28, 2023.

U.S. Appl. No. 18/309,118, Christian Boo, filed Apr. 28, 2023.

U.S. Appl. No. 18/223,091, Roger Ylikangas, filed Jul. 18, 2023.

U.S. Appl. No. 18/407,549, Karl Quist, filed Jan. 9, 2024.

* cited by examiner

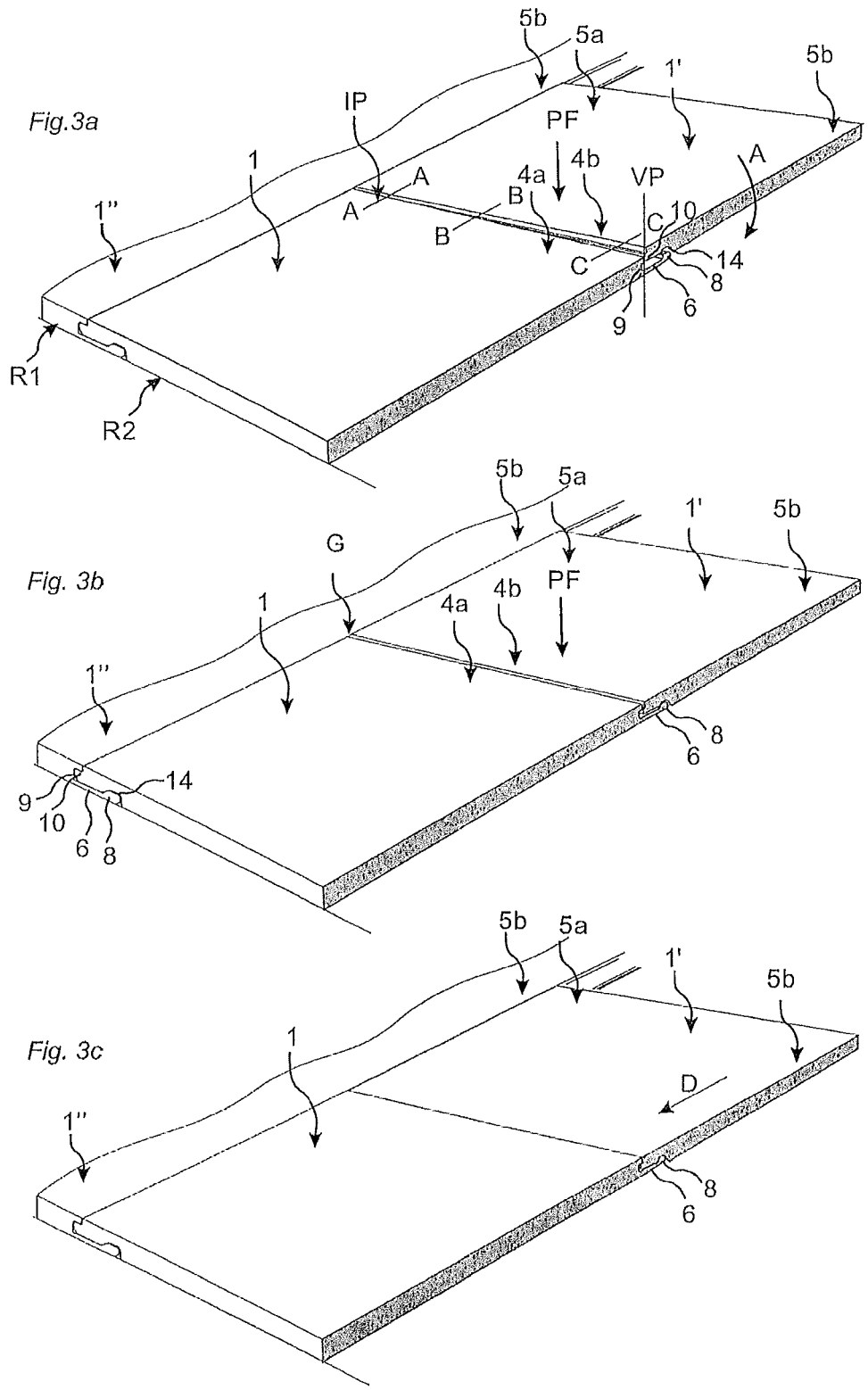

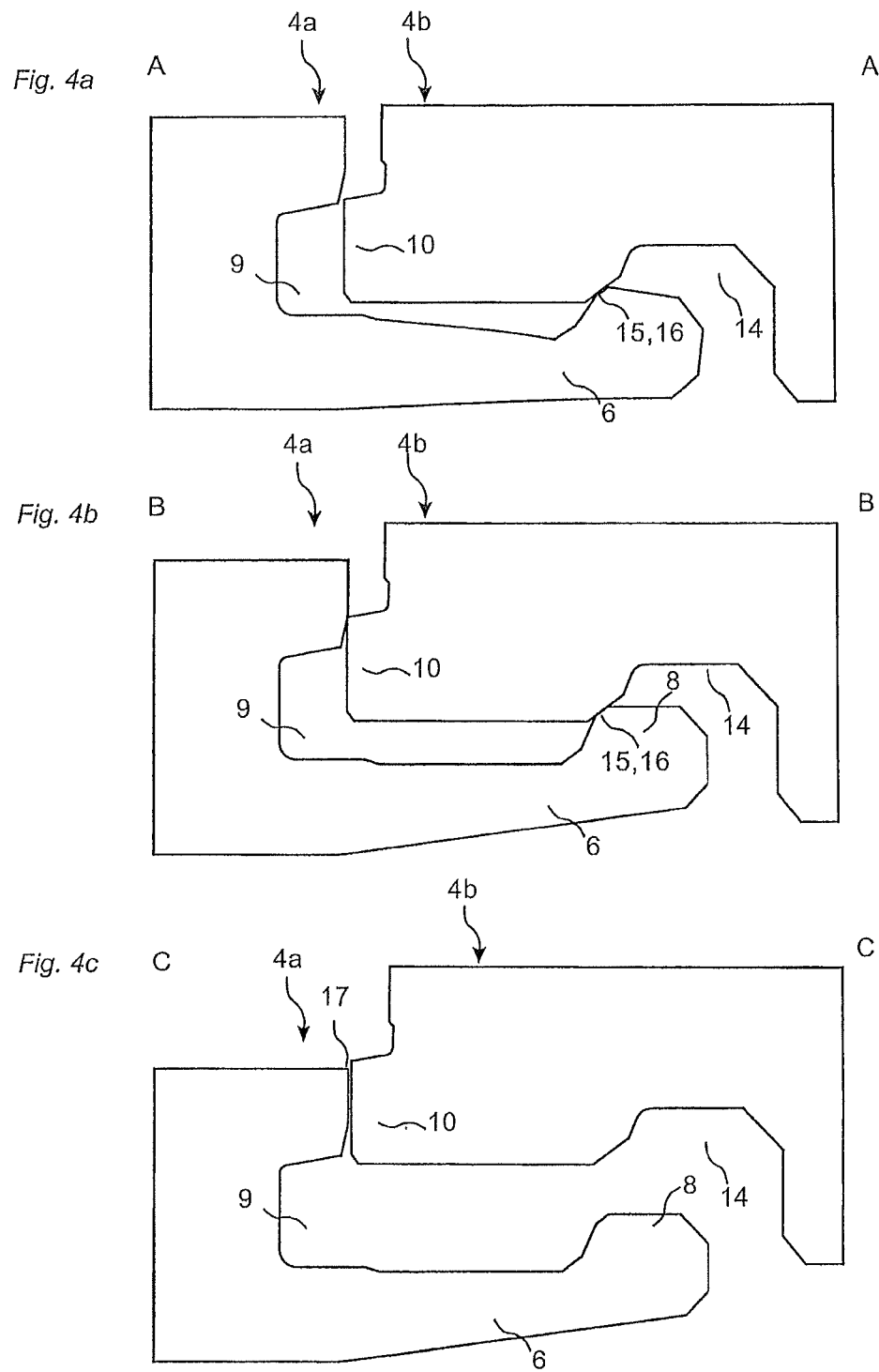

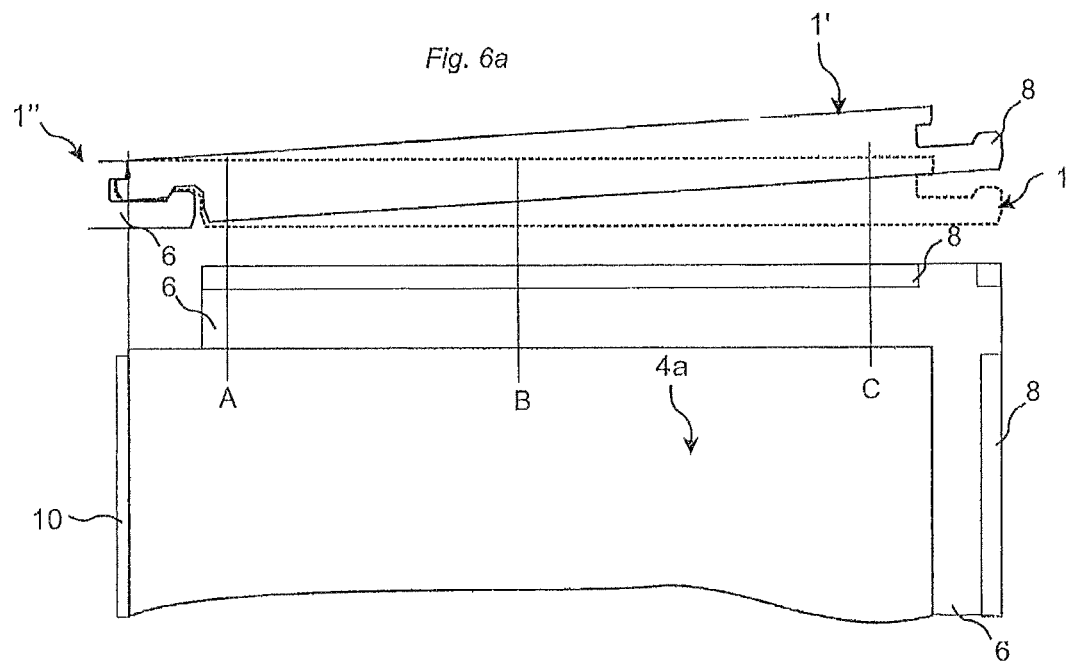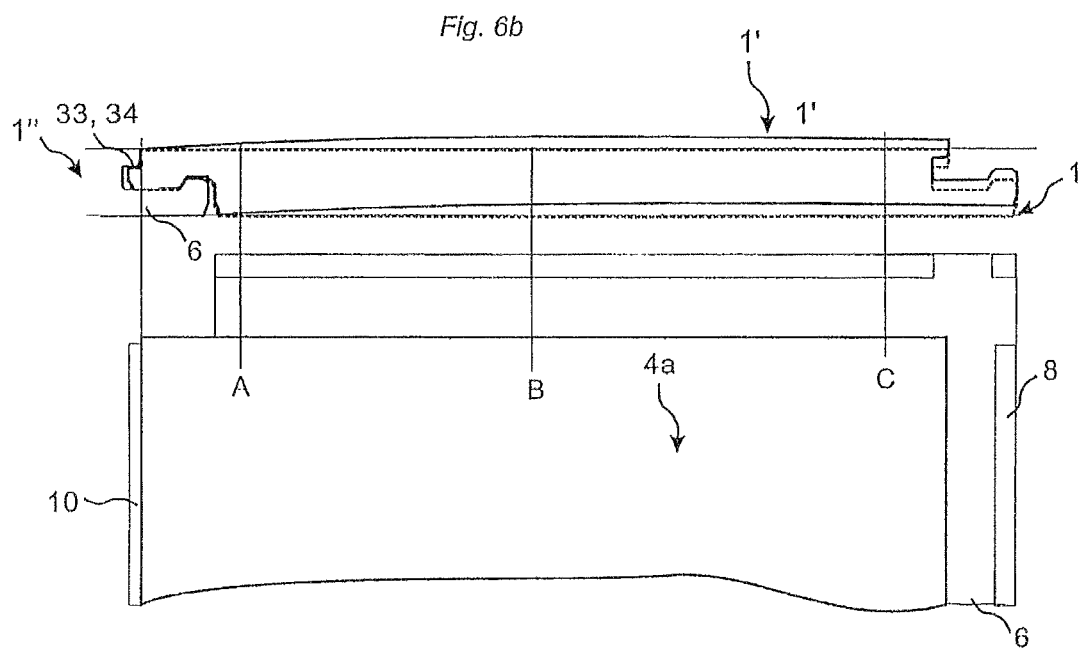

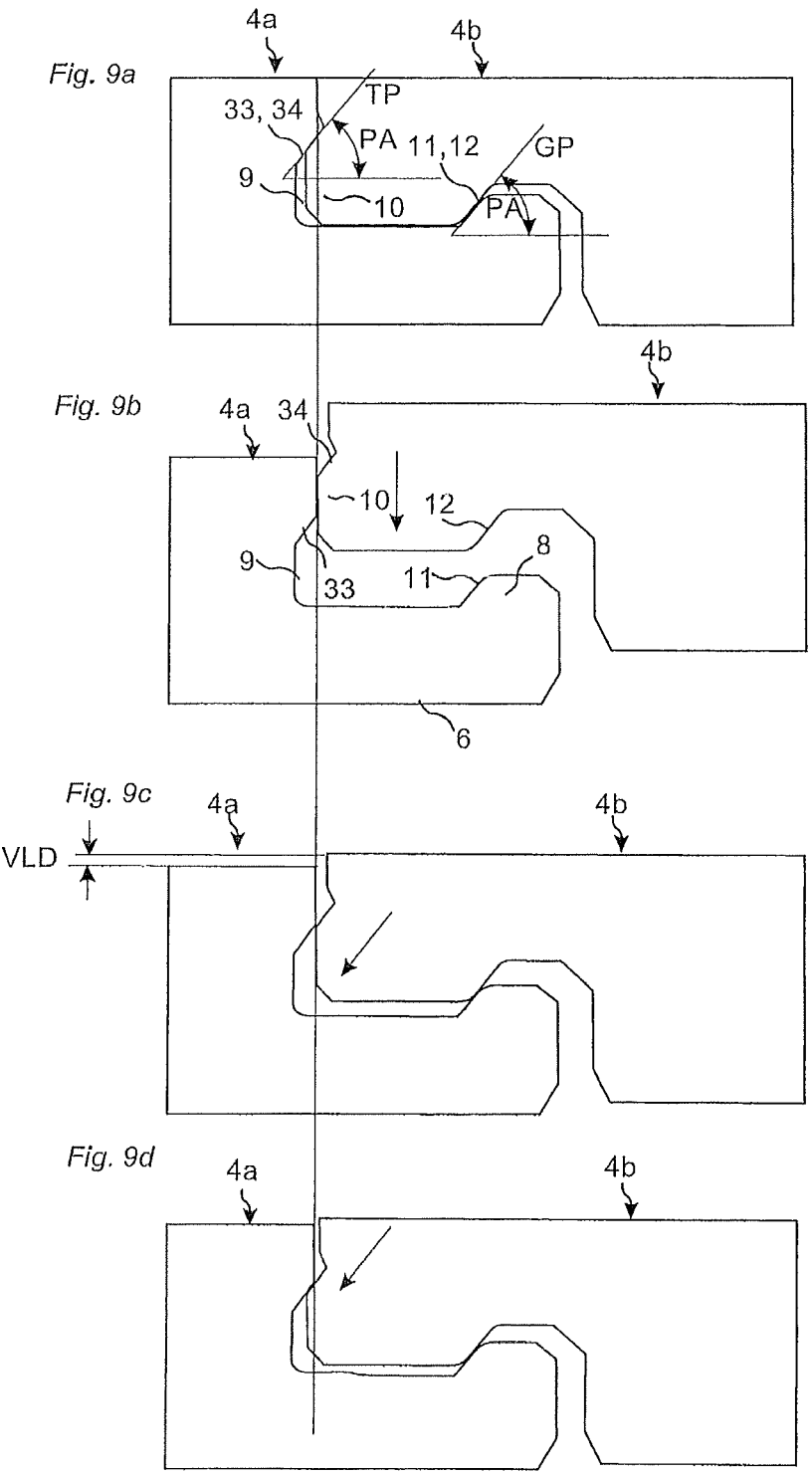

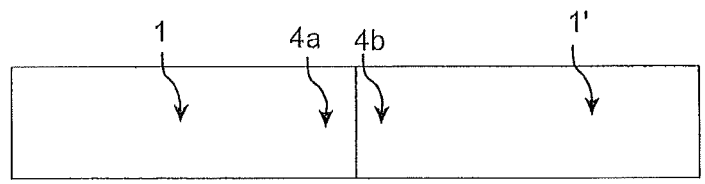
Fig. 11a
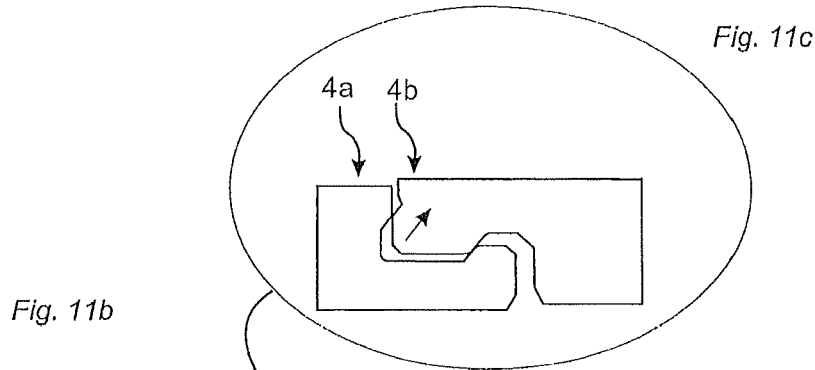
Fig. 11c
Fig. 11b
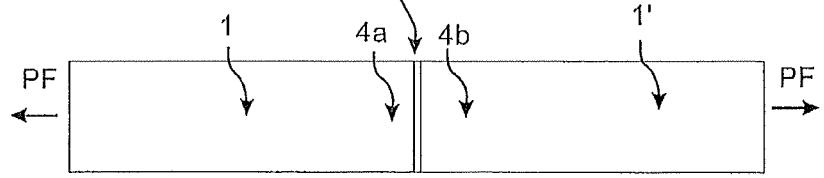
Fig. 11d
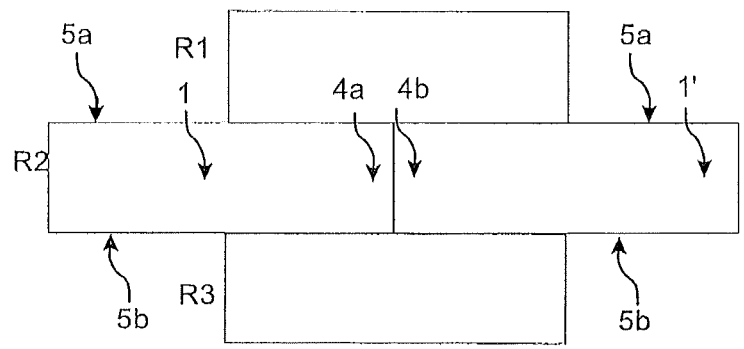

MECHANICAL LOCKING OF FLOOR PANELS WITH VERTICAL SNAP FOLDING

CROSS REFERENCE TO RELATED APPLICATIONS

The present application is a continuation of U.S. application Ser. No. 16/253,465, filed on Jan. 22, 2019, which is a continuation of U.S. application Ser. No. 15/695,437, filed on Sep. 5, 2017, now U.S. Pat. No. 10,214,917, which is a continuation of U.S. application Ser. No. 14/947,436, filed on Nov. 20, 2015, now U.S. Pat. No. 9,777,487, which is a continuation of U.S. application Ser. No. 14/011,121, filed on Aug. 27, 2013, now U.S. Pat. No. 9,212,492, which is a continuation of U.S. application Ser. No. 13/660,538, filed Oct. 25, 2012, now U.S. Pat. No. 8,544,234, which is a continuation of U.S. application Ser. No. 12/266,762, filed Nov. 7, 2008, now U.S. Pat. No. 8,353,140, and claims the benefit under 35 USC § 119(e) of U.S. Provisional Application No. 60/986,077, filed on Nov. 7, 2007. The entire contents of each of U.S. application Ser. No. 16/253,465, U.S. application Ser. No. 15/695,437, U.S. application Ser. No. 14/947,436, U.S. application Ser. No. 14/011,121, U.S. application Ser. No. 13/660,538, U.S. application Ser. No. 12/266,762, and U.S. Provisional Application No. 60/986,077 are hereby incorporated herein by reference in their entirety.

TECHNICAL FIELD

The invention generally relates to the field of floor panels with mechanical locking systems, which could be locked by a vertical snap folding. The invention provides new improved locking systems, floor panels with such locking systems and an installation method to connect such panels.

BACKGROUND

In particular, yet not restrictive manner, the invention concerns a mechanical locking system for rectangular floor panels with long and short edges. It should be emphasized that long and short edges are only used to simplify the description. The panels could also be square. However, the invention is as well applicable to building panels in general. More particularly the invention relates to the type of mechanically locking systems, which allow that all four edges of a panel could be locked to other panels by an angling action. The long and short edges have a mechanical locking system, which could be locked horizontally with a strip and a locking element on one edge that cooperates with a locking groove in another edge and vertically with a tongue in one of the edges that cooperates with a tongue groove in the other adjacent edge. The long edges could be locked with angling and the short edges with a combined vertical and horizontal snap action. The short edges locking system is preferably formed in one piece of a wood fibre or a plant fibre-based material or a plastic material that is a part of the panel core. The locking system could also be formed of a preferably separate wood fibre-based material, which is connected to the panel, preferably as an edge section, and glued to an upper and lower layer of the floor panel and formed by machining.

Floor panels with locking systems of this kind are described in for example WO 01/02669 (Akzenta), WO 01/51732, (Hulsta-Werke), WO 01/75247 (Perstorp Flooring), WO 01/77461 (Valinge) and WO 2001/088306 (Kronospan). The floor panels have a locking system comprising a locking element cooperating with a locking groove, for horizontal locking, and a very small tongue, which cooperates with a tongue groove, for vertical locking. The locking systems are designed such that fibres could be compressed and/or the strip could bend downwards during connection of two adjacent edges. Such locking system could be used to connect two adjacent short edges vertically and horizontally by a combined vertical and horizontal displacement. One edge could be pressed downwards vertically until the tip of the small tongue reaches the opening of the tongue groove. The small tongue is thereafter automatically pushed mainly horizontally into the tongue groove by the compressed fibres and/or by the strip and the locking element that snaps and springs back towards its initial position.

This type of vertical and horizontal snapping of the short edges is described as a locking system that could be combined with a long edge locking system that could be connected by angling. Long edge locking systems are shown which are mainly designed to lock the long edges such that they form a tight fit. Such long edge locking systems were originally used in combination with a horizontal snap system on the short edges. They were designed such that they could be displaced horizontally in order to lock the short edges with a horizontal snap action. The snapping is made with a hammer and a tapping block.

According to the known technology, a whole floor is intended to be installed with an angling action only where a long edge of a new "folding panel" is connected with angling to a first panel in a first row and where a short edge of this folding panel is connected with the same angling action by a vertical snap to a short edge of a second panel in a second row.

Such known locking systems, hereafter referred to as "vertical snap folding" systems have however not been successful on the market since they suffer from several major disadvantages as described below.

Displacement Friction

A vertical snap folding of this type requires a displacement of the folding panel along its long edge during the final stage of the folding action when the folding panel is angled down to the sub floor and when the short edges are connected by a combined vertical and horizontal snap action which is required to bring the small tongue into the tongue groove. There is a risk that the short edge locking system will not lock automatically since it is not able to overcome the friction between the long edges and to pull together the panels to the final locked position. The friction between the long edges is high mainly due to the geometry of the locking systems but also due to production tolerances, swelling, shrinking, and bending of the panels. A gap between the short edges will in most cases remain after the folding and the panels must be displaced horizontally with a hammer and a tapping block along the locked long edges in order to finally lock the short edges. This make installation complicated and there is a great risk that the locking system could be damaged. It is not possible to use just a lose connection on the long side with low friction that could compensate for the swelling and bending since this will give a low-quality locking system with for example open gaps and the locking system will not be able to prevent moisture and dirt to penetrate into the joint.

Small Tongue

The design of the short edge locking system is such that a tip of the tongue that is inserted into the tongue groove is made very small in order to allow vertical snapping without damaging parts of the locking system during the vertical pressing of the short edges. The contact surfaces between the upper part of the tongue and the tongue groove are therefore made very small and they are generally rounded or inclined in order to allow the insertion of the tongue into the groove. The vertical locking it not reliable and strong enough and an undesired unlocking could occur during swelling and shrinking of the installed floor or when a heavy load is applied on the floor surface.

Flexibility and Guiding

The design of the strip and the locking element is such that the flexibility of the strip and the vertical guiding of the locking element into the locking groove are not sufficient to guarantee a reliable and easy locking. The edges must be knocked together with a hammer and a tapping block or pressed very hard vertically against each other. Parts of the locking system are often damaged during such installations.

The inventor has discovered that such installation problems often occur when the panels are thin, for example 6-9 mm and have a width of more than 100 mm, for example 100-300 mm. Such panels are very flexible, and the long edges are not able to support the middle parts of the short edges and keep them in a vertically locked position. The small tongue could snap out vertically when people walk on the floor. The vertical snap resistance during installation is considerable. Some panels are especially difficult to handle for example long panels, panels with compact locking systems or with locking systems locked with pretension and panels comprising core materials with rough fibre structures. All such panels could be very difficult to displace in locked position along the long edges and they are in principle not possible to lock with a vertical snap action without major problems.

In order to overcome these problems locking systems have been developed that do not require a displacement of a panel during vertical locking. Such displacement is replaced by a displacement of a flexible tongue. Such flexible tongue locking systems, for example as described in WO 2006/043893 (Valinge), comprise a separate flexible tongue with a protruding part that could be displaced horizontally during locking. A panel with a flexible and displaceable tongue is very easy to lock vertically without the use of a hammer and a tapping block and solves all the above-mentioned problems. The disadvantage of such systems is that a separate tongue has to be produced and inserted into a panel edge during production.

A vertical snap folding system which requires a displacement of a panel during the final stage of the locking could however be competitive against the flexible tongue systems if the above-mentioned disadvantages could be eliminated since it is very easy and cost efficient to produce. The whole locking system could be formed in one piece with the core of the panel and no separate materials have to be produced with special tools and inserted into the short edge.

The invention aims to solve installation problems in flooring which is intended to be installed with a vertical snap folding system having a short edge locking system with a tongue formed in one piece with the panel core and where the short edge locking system requires a horizontal displacement of a panel that is locked with its long edge to an adjacent panel.

Definition of Some Terms

In the following text, the visible surface of the installed floor panel is called "front face", while the opposite side of the floor panel, facing the sub floor, is called "rear face". The edge between the front and rear face is called "joint edge". By "horizontal plane" is meant a plane, which extends parallel to the outer part of the surface layer. Immediately juxtaposed upper parts of two adjacent joint edges of two joined floor panels together define a "vertical plane" perpendicular to the horizontal plane. By "horizontally" is meant parallel to the horizontal plane and by "vertically" is meant parallel to the vertical plane. By "up" is meant towards the front face and by "down" towards the rear face.

By "joint" or "locking system" are meant co acting connecting means, which connect the floor panels vertically and/or horizontally. By "mechanical locking system" is meant that joining can take place without glue. Mechanical locking systems can in many cases also be combined with gluing. By formed "in one piece" with the panel means formed by machining of the panel core or by machining of a material that is fixed connected to the panel. By "integrated with" means formed in one piece with the panel or factory connected to the panel.

By "angling" is meant a connection that occurs by a turning motion, during which an angular change occurs between two parts that are being connected or disconnected. When angling relates to connection of two floor panels, the angular motion takes place with the upper parts of joint edges at least partly being in contact with each other, during at least part of the motion.

By an "angling locking system" is meant a mechanical locking system which could be connected vertically and horizontally with angling comprising a tongue and a grove that locks two adjacent edges in a vertical direction and a locking strip with a locking element in one edge of a panel called "strip panel" that cooperates with a locking groove on another edge of a panel called "grove panel" and locks the edges in a horizontal direction. The locking element and the locking groove have generally rounded guiding surfaces that guide the locking element into the locking groove and locking surfaces that locks and prevents horizontal separation between the edges.

By "vertical snap folding" is meant a connection of three panels where the long edges of a first and second panel are in a connected state with at least a part of their locking systems in contact and where an angling action of a long edge of a new panel, referred to as the "folding panel", automatically and without the use of tool such as a hammer and a tapping block, connects a long edge of the folding panel to a long edge of the first panel and a short edge of the folding panel to a short edge of the second panel. The short edges of the panels are designed such that they could not be folded together along a vertical plane with their top edges in contact since they are spaced apart during folding by a part of the vertical locking system, for example a tongue, which is not possible to compress or displace during locking in order to bring the top edges into contact. The locking of the short edges is therefore a type of a double snap action where a vertical and horizontal displacement is required in order to accomplish the locking. The first vertical folding motion of the short edges takes place gradually from one short edge part to the other as scissors when the folding panel is angled down to the sub floor. The second motion is an essentially horizontal displacement of the whole folding panel during the final stage of the folding motion.

With "installation angle" is meant the generally used angel between two panels which are in the initial stage of an angling installation when one panel is in an upwardly angled position and pressed with its upper edge against the upper edge of another panel laying flat on the sub floor. The installation angle is generally about 25 degrees. A part of the tongue is in the tongue groove and the upper part of the locking element has not entered the lower part of the locking groove.

With "displacement angle" is meant an angle between two floor panels during angling when a part of the tongue has entered a tongue groove and upper part of the locking element has entered a locking groove and prevents a horizontal separation of the edges and when there is sufficient space, gaps or plays between parts of the locking systems to allow easy displacement of the long edges along the adjacent edges.

With "locking angle" is meant the angle of the long edges when they are completely or almost completely locked with their locking surfaces is contact. The locking angle is in most cases zero and the panels are laying flat on the sub floor with their front faces parallel to the horizontal plane.

SUMMARY

Embodiments of the present invention aim at a set of floor panels or a floating flooring with a mechanical locking system, which will improve installation of floor panels installed with vertical snap folding.

The invention is based on a first basic understanding that the problems with a vertical snap folding installation are mainly related to the locking system at the long edges and not to the short edges. All known angling locking systems, especially the majority that comprises a strip with a locking element in one edge that cooperates with a locking groove in an adjacent edge, are very easy to displace along the joint when the floor panels are in an initial angled position in relation to each other. The friction increases considerably at a low angle when the floor panels are almost in a locked position. This means that the friction between the long edges is at its maximum level when the long edges must be displaced in order to allow the short edges to be locked to each other with the vertical and horizontal snapping action. The long edge friction makes installation difficult and unreliable and there is a considerable risk that the locking system on the short edge will be damaged.

The invention is based on a second understanding that the combined function of the long edge locking system and the short edge locking system is essential in a floor, which is designed to be installed with vertical snap folding. Long and short edge locking systems should be adapted to each other in order to provide a simple, easy, and reliable installation. The long edges must be easy to displace mainly during locking. However, it is in fact an advantage in the installed floor that they are not to lose since the whole row could slide against an adjacent row and dirt could penetrate into the joint. The short edge locking system should be very flexible in order to allow installation with a low pressing force such that locking could be made without a hammer and a tapping block. This flexibility must however be combined with two other features where flexibility is a disadvantage. The locking system should give a strong lock and prevent separation of the edges when the floating floor shrinks for example during the winter period. The short edge locking system and should also be able to overcome the friction on the long edges and to pull the panels automatically together during the final stage of the vertical snap action.

The invention is based on a third understanding that the vertical locking between the tongue and the tongue groove on the short edge must be improved in order to guarantee a reliable locking function especially in thin and wide floor panels. The short edge locking system must be such that it allows a tongue with larger and more horizontal contact surfaces to be connected into a tongue groove and preferably also with a lower pressing force such that the installation could be made with a hand pressure only and without tools.

A first objective of embodiments of the invention is to solve the friction problem caused by the displacement of the long edges during installation with a vertical snap folding locking system.

A second objective of embodiments of the invention is to provide a floor panel with long and short edge locking systems that could be locked with a vertical snap folding and with a lower vertical pressing force than the known systems.

The invention provides for new embodiments of locking systems at long and short edges according to different aspects offering respective advantages. The invention provides embodiments of a new method to install floor panels with vertical snap action. Useful areas for the invention are building panels such as wall panels, ceilings and especially floor panels of any shape and material e.g., laminate; especially panels with surface materials contain thermosetting resins, wood, HDF, veneer, paint, resilient plastic materials, plastic or textile fibres, linoleum, Cork, and similar and core materials such as wood, HDF, particle board, plywood, and similar materials.

Embodiments of the invention comprise according a first aspect of the first objective a set of essentially identical floor panels each comprising long and short edges provided with a mechanical locking system comprising first and second connectors integrated with the floor panels, and wherein immediately juxtaposed upper parts of two adjacent joint edges of two joined floor panels together define a vertical plane perpendicular to the main plane of the panels. The first connector comprises a locking strip with an upwardly directed locking element, at a first edge of a floor panel, configured to cooperate with a downwardly open locking groove at an adjacent second edge of another floor panel for connecting the adjacent edges in a horizontal direction perpendicular to the vertical plane. The second connector comprises a tongue, either at the first or at the second edge, extending horizontally perpendicular to the vertical plane, configured to cooperate with a horizontally open tongue groove at the other of said first or second edge for connecting the adjacent edges in a vertical direction parallel to the vertical plane. The connectors at the long edges are configured to be locked with angling and the connectors at the short edge are configured to be locked with vertical snap folding, whereby a long edge of a new panel in a second row is configured to be connected to a long edge of a first panel in a first row by angling, whereby a second short edge of the new panel and a first short edge of a second panel in the second row are configured to be connected with the same angling motion. The tongue at one of the short edges is formed in one piece with the panel and protrudes from a substantially vertical upper surface at said one short edge. The locking strip at the short edges is bendable, to obtain a resilient bending during the vertical snap folding action, which bending facilitates the assembling of the tongue and the tongue groove. The first and the second connector at the long edges are configured to obtain a minimum of friction facilitating a displacement, by a spring back force from the bending of the short edge locking strip, of the new panel in the horizontal direction along the long edge during the vertical snap folding action.

The first aspect offers the advantage that the locking takes place automatically and that no side pressure has to be applied in order to lock the panels. The locking system on the short edge with its bendable strip is capable to overcome the friction between the long edges and to pull together the edges automatically. Only an angling action is sufficient to lock the floor panels and such locking could be made with a hand pressure and without tools Embodiments of the invention comprise according a second aspect of the first objective an installation method to eliminate displacement friction between long edges and to connect rectangular floor panels vertically and horizontally with vertical snap folding vertically and horizontally along long and short edges.

Rectangular floor panels are provided with mechanically locking systems at the long and the short edges. The short edges comprise a vertical snap folding system and the long edges an angling locking system. The method comprises the steps of:
- a) laying a first panel flat on a sub floor.
- b) bringing a second panel in an angled position with its long edge in contact with a long edge of the first panel.
- c) bringing a long edge of a new panel in an angled position and in contact with an upper part of a long edge of the first panel, whereby the new panel has a higher angle against the sub floor than the second panel,
- d) bringing a short edge of the new panel in contact with a short edge of the second panel,
- e) pressing and displacing the short edge of the new panel downward and horizontally along the long edge towards the short edge section of the second panel and thereby connecting the edges of the first and the second panels to each other in an essentially common plane with a vertical snap folding,
- f) angling the new and the second panel downward towards the sub floor and thereby finally connecting the first, second and third panel to each other in a common plane with vertical snap folding.

The second aspect offer the advantages that the connection of the short edges with vertical snap folding is made when the panels are in an angled position and when the long edges are easy to displace. The installation could be made very easy and with a limited friction force, even in the case that the panels are locked with a tight fit and/or high friction between the long edges when they are finally angled down to the floor. A whole row could be connected with a vertical snap folding in an angled position and the whole row could thereafter be angled down. A row could also be folded down partly and gradually during installation if the panels are thin and flexible. A very low angle of for example only a few degrees could be sufficient to bring the long edges in a position where the friction is considerably lower than in a locking angle when the panels are laying on the sub floor connected in a common plane.

Embodiments of the invention comprise according a first aspect of the second objective a set of essentially identical floor panels each comprising long and short edges provided with a mechanical locking system comprising first and second connectors integrated with the floor panels. Immediately juxtaposed upper parts of two adjacent joint edges of two joined floor panels together define a vertical plane perpendicular to the main plane of the panels. The first connector comprises a locking strip with an upwardly directed locking element, at a first edge of a floor panel, configured to cooperate with a downwardly open locking groove at an adjacent second edge of another floor panel for connecting the adjacent edges horizontally in a direction perpendicular to the vertical plane. The second connector comprises a tongue, either at the first or the second edge, extending horizontally perpendicular to vertical plane, configured to cooperate with a horizontally open tongue groove, at the other of said first or second edge, for connecting the adjacent edges in vertical direction parallel to the vertical plane. The connectors at the long edges are configured to be locked with angling and the connectors at the short edge are configured to be locked with vertical snap folding. The tongue at one of the short edges is formed in one piece with the panel and configured to protrude from a substantially vertical upper surface at the short edge with the tongue. The mechanical locking system at the long edges is configured such that a new panel is displaceable vertically substantially along the vertical plane of a first panel and relative the first panel when the new floor panel is in an angled position in relation to the first floor panel and with the tongue within the tongue groove and the upper part of the locking element within the locking groove.

This first aspect of the second objective offers the advantages the short edge of the new panel could move vertically in an installation angle. This means that the short edge of this new panel could be pressed down towards a second panel that also is in an installation angle and that such pressing could be made with the short edges of the new and second floor panels in a substantial parallel position. This embodiment of the invention allows that vertical snap folding of the short edges could be made easier with a lower pressing force than with the present known technology. No tools such as a hammer and a tapping block are needed, and easy installation could be combined with a strong vertical and horizontal locking.

Embodiments of the invention comprise according a second aspect of the second objective a set of essentially identical floor panels each comprising long and short edges. The short edges are provided with a mechanical locking system comprising first and second connectors integrated with the floor panels. The first connector comprises a locking strip with an upwardly directed locking element, at a first short edge of a floor panel, configured to cooperate with a downwardly open locking groove at an adjacent second short edge of another floor panel for connecting the adjacent edges horizontally. The second connector comprises a tongue, either at the first or the second short edge, extending horizontally, configured to cooperate with a horizontally open tongue groove, at the other of said first or second short edges, for connecting the adjacent edges in vertical direction configured to be locked with a vertical motion. The tongue at one of the short edges is formed in one piece with the panel and configured to protrude from a substantially vertical upper surface at the short edge with the tongue. An upper surface of the tongue is substantially parallel to a locking surface of the locking groove. The angle of the upper surface of the tongue and the locking surface of the locking groove against the horizontal plane is more than about 50 degrees. The short edge with the tongue groove is provided with a second tongue above the tongue groove, which tongue protrudes horizontally.

This second aspect of the second objective offers the advantages that the locking system on the short edges, comprising two tongues could be locked easier and without any sharp surface portions in contact with the tongue during the folding. Only the two tongues, which both could have rather smooth surfaces, will be in contact with each other during folding. A lower pressing force than with the present known technology could be used.

All references to "a/an/the [element, device, component, means, step, etc.]" are to be interpreted openly as referring to at least one instance of said element, device, component, means, step, etc., unless explicitly stated otherwise.

BRIEF DESCRIPTION OF THE DRAWINGS

The following drawings show exemplary embodiments, to which the claimed invention is not limited.

FIGS. 3a-3c show installation of floor panels according to an embodiment of the invention.

FIGS. 4a-4c show installation of short edges with a combined vertical and horizontal snap action according to an embodiment of the invention.

FIGS. 6a-6b show the function of the long and short edges during installation with vertical snap folding according to an embodiment of the invention.

FIGS. 9a-9d show embodiments of locking systems according to the invention.

FIGS. 11a-11d show embodiments of locking systems according to the invention where short sides are locked with long sides.

DETAILED DESCRIPTION OF EMBODIMENTS OF THE INVENTION

Figure 1A:
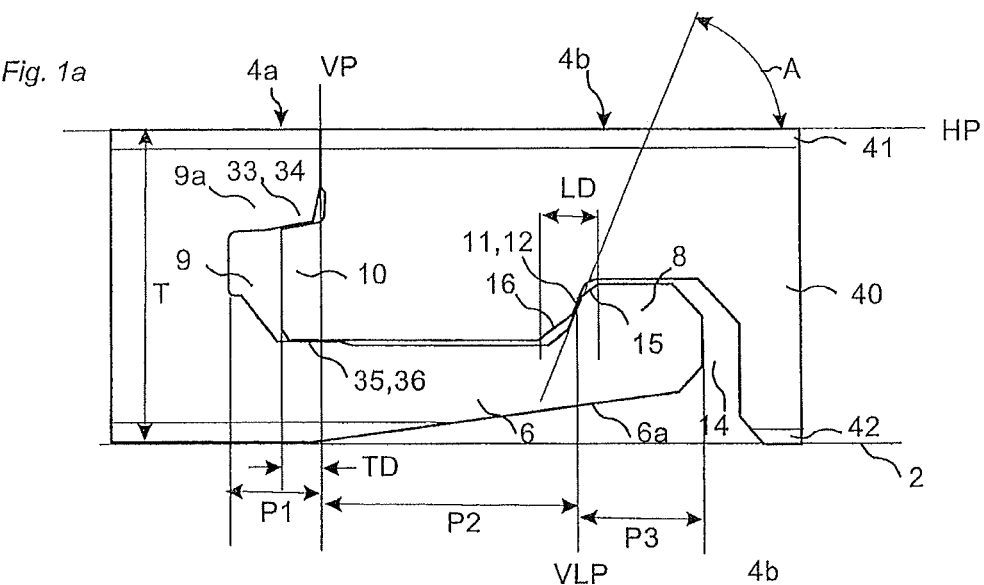
FIGS. 1a-1c show a short edge locking system according to an embodiment of the invention.

FIG. 1a shows a locking system that could be used to lock adjacent edges of essentially identical panels, comprising a core 40, a surface layer 41 and a balancing layer 42, vertically and horizontally and that could be used to install panels with a vertical snap folding action. The locking system has a strip 6 extending from a vertical plane VP with an upwardly extending locking element 8 in a first panel edge 4a and a downwardly open locking groove 14 in a second adjacent panel edge 4b. The locking element 8 cooperates with the locking groove 14 and locks the adjacent edges 4a, 4b in a horizontal direction perpendicular to the vertical plane VP and parallel to a horizontal plane HP. The locking system has a tongue 10 in the second panel edge 4b, the folding panel, extending from the vertical plane VP and a tongue groove 9 in the first panel edge, the strip panel, for vertical locking of the adjacent edges. The strip 6, locking element 8, the locking groove 14, the tongue 10 and the tongue groove 9 are formed in one piece with the panel. The locking element has a locking surface 11 and an upper guiding surface 15 in its upper part adjacent to the locking surface 11. The locking surface 11 is preferably essentially planar and extends upwardly to a guiding surface 15 which could be inclined or rounded. The upper guiding surface 15 comprises parts that are less inclined against the horizontal plane HP than the locking surface 11. The locking groove 14 has a groove locking surface 12 that cooperates with the locking element locking surface 11 and prevents essential separation of the adjacent edges in the horizontal direction. The locking groove has also a lower guiding surface 16 at its lower part adjacent to the groove locking surface 12 that comprises parts that are less inclined against the horizontal plane than the locking surface 12. The tongue 10 has upper 33 and lower 36 contact surfaces that cooperate with adjacent upper 34 and lower 35 contact surfaces of the tongue groove 9 and lock the adjacent edges in the vertical direction. The strip 6 comprises three parts, an inner groove part P1 located between the inner part of the tongue groove 9 and the vertical plane VP, an outer locking part P3 located between the outer part of the strip 6 and a vertical locking plane VPL comprising the locking surfaces 11, 12, and an intermediate flexible part P2 located between the inner groove part P1 and the outer locking part P3. The three parts P1+P2+P3 should preferably be larger than the floor thickness T. The flexibility will improve if P1+P2 are larger than the floor thickness. A lower part 6a of the strip 6, extending at least over a part of the intermediate part P2 and preferably also over the whole outer locking part P3 is located in a plane which is above the rear face of the panel. Such a strip with an essentially upwardly extending lower side 6a could be made very flexible and the strip 6 could be bent downwards during the vertical snap folding action without contact with the sub floor or an underlay 2 laying on the sub floor. The horizontal locking will be more reliable if at least a part of the balancing layer 42 within the intermediate flexible part P2 is removed from the lower part of the strip 6. The balancing layer could cause unpredictable strip bending after machining of the locking system and when humidity changes. An essential feature of this locking system is that the tongue 10 preferably extends from the vertical plane VP over a tongue distance TD, which is at least 0.1 times the floor thickness T or about at least 0.8 mm. This guarantees a reliable vertical locking that will not be unlocked after installation when the panels swell and shrink and are subject to heavy load on the surface. It is preferred that the upper contact surfaces are essentially planar and parallel to the horizontal plane. With essentially planar is meant an angle to the horizontal plane of about 0-10 degrees and in the case that the surface has a curved shape, a tangent line that does not exceed about 10 degrees. Upper contact surfaces that are completely planar (about +−3 degrees) or almost planar (about +−5 degrees) are even more preferable since they give a stronger locking, and the production tolerances are easier to handle. Of course, higher angles could also be used for example even up to about 45 degrees and more, provided that the locking surfaces 11, 12 have a locking angle A which preferably is higher, preferably at least about 10-30 degrees higher, than the angle of the upper contact surfaces 33, 34. Embodiments where the locking surface has a lower angle than the upper contact surfaces are not excluded. Parts of the locking element and the locking groove extends preferably over a locking distance LD, defined as the horizontal extension of the guiding surfaces 15, 16 and the locking surfaces 11, 12, that is equal or larger than the tongue distance TD. The guiding surfaces 15, 16 comprises all parts of the upper part of locking element 8 and the lower part of the locking groove 14 that are inclined against the horizontal plane HP of at least about 25 degrees. Lower angles will in most cases not give a sufficient guiding function. This design ensures that the guiding surfaces 15, 16 will grip behind each other and press the locking strip downwards during an initial stage of the locking action and then to pull the tongue 10 into the tongue groove 9 during the final stage of the locking when the locking element 8 is guided and snapped vertically into the locking grove 14. Such a locking system could have a considerable pulling force that automatically could overcome the friction between the long edges and displace the panels horizontally into a final locked position. It is preferred the guiding surfaces are inclined at least about 25 degrees against the horizontal plane but less than about 60 degrees. All angles are defined as the locking angel A in FIG. 1a. An especially preferred embodiment is characterized in that the locking surfaces and the guiding surfaces are essentially planar and that the locking surfaces have an angle of about 50 to 90 degrees and the guiding surfaces an angle of about 30-50 degrees. The locking surface could also have an angle exceeding 90 degrees. The inner groove part P1 of the shown embodiment is preferably larger than two times the tongue distance TD. Such a design will improve the locking function since the strip and also the upper part 9a of the locking groove will be more flexible. The upper part 9a could be slightly bended upwards during locking when the tongue enters the tongue groove.

Figure 1B:
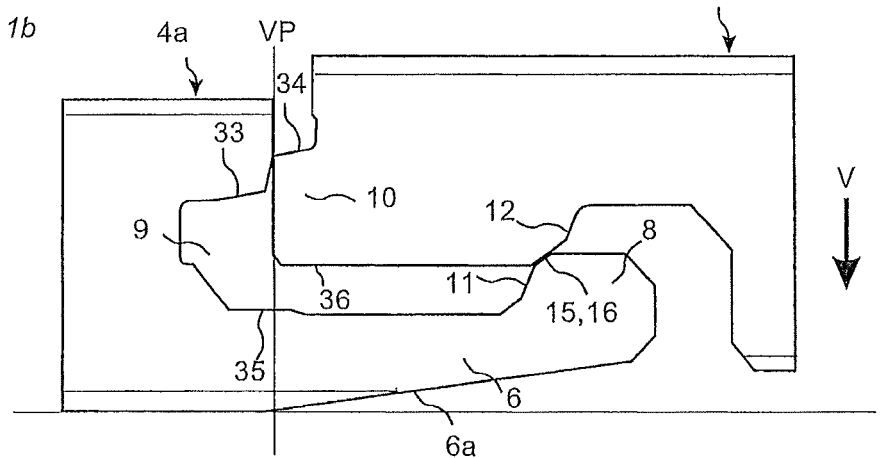
Figure 1C:
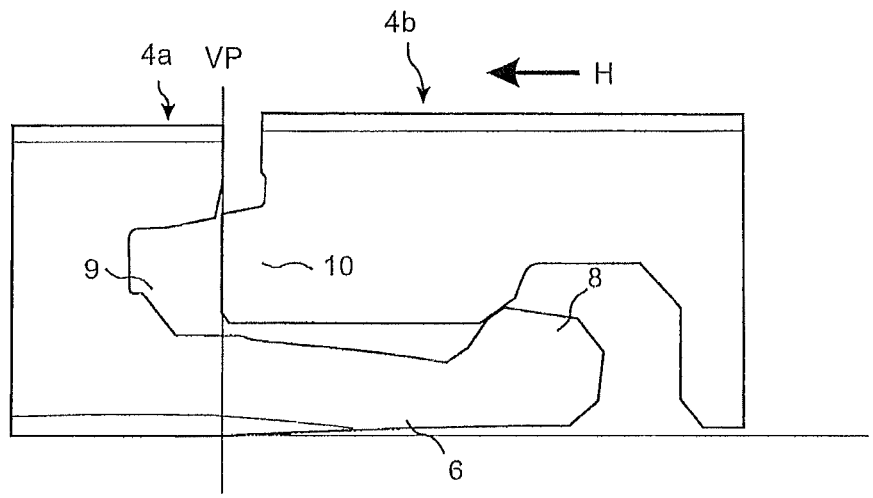

FIG. 1b show the position of the panels 4a, 4b during the vertical snap folding when the guiding surfaces 15, 16 are in contact with each other. A further vertical motion V of the folding panel 4b will press and bend the strip 6 downwards as shown in FIG. 1c and the tongue 10 inwards towards the adjacent edge until the upper part of the tongue 10 reaches the opening of the tongue groove 9. The guiding surfaces will than press the tongue 10 into the tongue groove 9 and the new panel will be displaced horizontally H essentially over a distance which is equal to the tongue distance TD. The horizontal displacement might be slightly smaller than the tongue distance TD due to fibre compression between parts of the locking system.

Figure 2A:
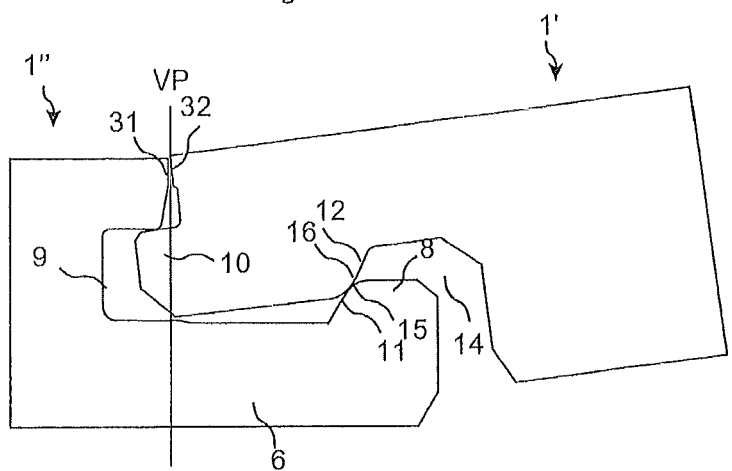
FIGS. 2a-2b show a long edge locking system according to an embodiment of the invention.

FIG. 2a shows a long edge locking system that could be locked with angling. The adjacent edges 1" and 1' are in a displacement angle, which in the shown embodiment is about 5-8 degrees. A displacement angle could be between about 1 and 20 degrees or even larger depending on the design of the locking system. A part of the tongue 10 has entered the tongue groove and prevents vertical separation. An upper part of the locking element 8, in this embodiment the guiding surface 15, has entered a lower part of the locking groove 14, in this embodiment the part that forms the guiding surface 16, and prevents a horizontal separation of the edges 1", 1'. The figure shows that there is sufficient space, gaps or plays between parts of the locking systems for example between the parts that locks horizontally such as the upper edges 31, 32 and/or the locking element 8 and the locking groove 14, and the parts that locks vertically such as the upper and/or the lower parts of the tongue 10 and the tongue groove 9. This allows easy displacement of the adjacent long edges along the joint in an up angled position. Most known locking systems are easy to displace in an up angled position and many are also possible to adjust such that panels with such systems could be easy to displace in a displacement angle when they are angled the edges are partly locked vertically and horizontally.

Figure 2B:
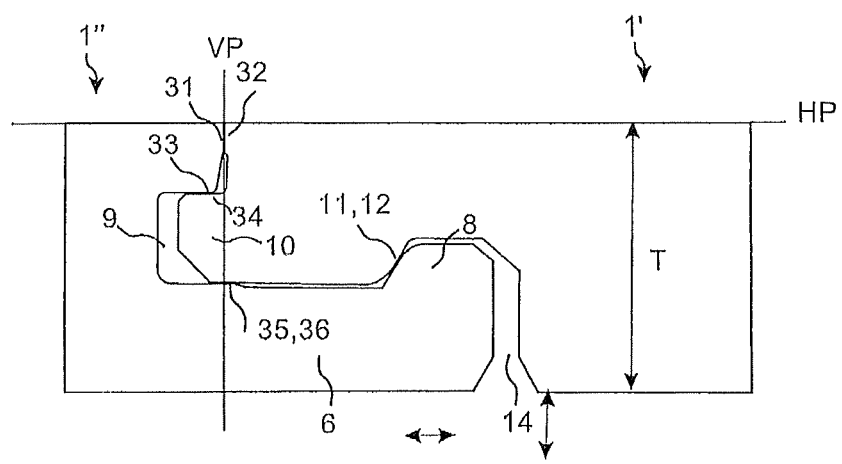

FIG. 2b shows that a locking system also could be easy to displace in a locking angle when the edges are completely in a final locked position. The adjacent operative contact surfaces between the upper parts of the joint edges 31, 32, the upper and lower tongue and tongue grove contact surfaces 33, 34, 35, 36 and the locking surfaces 11, 12 have been reduced to a minimum and there are spaces or plays between all other non-operative surfaces. This embodiment is characterized in that all operative surfaces that in a locked position are in contact with each other are such that they extend over a total length, which is less than the floor thickness, preferably about 0.4-0.6 times the floor thickness T. Such a locking system will be easy to displace especially if there is a small play between the locking surfaces when the top edges are pushed against each other. Such a play could be very small, and it is sufficient that it allows displacement. It could also be in the magnitude of 0-0.01 mm only. It will reduce the friction and will be visible as a small gap of some 0.01 mm when the panels are pulled away from each other with a force equal to ⅓ of the maximum locking force when panels are unlocked from each other. It could be mentioned as a non-limiting example that a strong vertical and horizontal locking could be obtained with operative contact surfaces that are very small especially in HDF material. A locking system could have a design with a cross section where the locking surfaces (12, 12) or upper contact surfaces (31, 32) could be for example only 0.3 mm. Upper and lower contact surfaces could for example have a horizontal extension of about 0.5 mm. The total length of the operative surfaces could be reduced to about 3.2 mm in a laminate floor with a thickness of 8 mm.

FIGS. 3a-3c show locking of three panels with a vertical snap folding. The long edge 5b of the panels 1, 1' is shown as cut of part in order to simplify the description of the short edge locking system. This edge of a full-size panel has of course a strip with a locking element. FIG. 3a show that a long edge 5b of a first panel 1" in a first row R1 is locked to an adjacent long edge of second panel 1 in a second row R2. A new panel 1' in the second row is locked by angling with its long edge 5a to the long edge 5b of the first panel 1". FIG. 3a shows the position of the new folding panel 1, when an inner part IP of the short edge locking strip 6 is partly bended downwards. The locking systems on the long 5a, 5b and short edges 4a, 4b are designed such that the panels will automatically slide in a locked position when a vertical pressure force PF will be applied on the short edge 4b of the fold panel 1'. It is a major advantage if such a locking could be made without the use of tools such as a hammer and a tapping block that is commonly used to connect floor panels with horizontal snapping. The pressure could be as low as about 100 N and even lower. The locking systems could also be designed to lock automatically with a pressure force PF of for example about 200 N. The floor panels could then be installed with a one hand pressure only. If a pressure force of about 400 N is required, generally two hands should be used to press down the edge. A pressure force of more than about 600 N is not appropriate since this requires that the installer has to press very hard or to walk on the edge or to hammer the panels together. A locking system that could be locked automatically with a pressure force on the short edge of 100-400 N is ideal since this gives an easy installation with a strong locking and a pulling force that is able to overcome a considerable friction between the long edges.

The function of the short edge locking system, locking the adjacent edges 4a and 4b of the second 1 and the new 1' panels, will now be explained in detail with reference to FIGS. 4a-4c that show a cross section A-A at an inner part close to the locked long edge 5a, an outer cross section C-C close to the free long edge and a middle cross section B-B located between the inner and outer sections.

FIG. 4a show that the inner part A-A is almost in lowest position and the strip 6 is bent to its maximum bending position. FIG. 4b show that the middle section B-B is in a position where parts of the locking element 8 and the locking groove 14 are in contact, in this embodiment the guiding surfaces 15, 16. FIG. 4c show that the locking of the outer part C-C has not started yet and the locking element 8 is not in contact with the locking groove 14. This means that the edge 4b cannot be displaced horizontally until the whole panel edge has been brought into an essentially horizontal position, as shown in FIG. 4a, and the friction between the long edges 5a, 5b is on its maximum level. This position, with a gap G between top edges, is shown in FIG. 3b. A vertical snap folding is a type of locking where the edge is displaced gradually vertically from one inner part to an outer part. The strip 6 must therefore be designed such that it can both bend downwards vertically but also that it could be twisted vertically from one edge part to the other along the joint during the vertical locking motion. Such a design is shown in FIG. 1a-1c. FIG. 3c shows the second 1 and the new 1' panels in a locked position after the horizontal displacement D, which occurs when the strip 6 snaps back toward its initial position. Such a snap pull back force must exceed the friction resistance between the long edges. The locking system between long edges 5a, 5b must be designed such that it allows a displacement in a locking angle when the panels are locked in the same plane. The panels are according to this embodiment of the invention configured such that the locking system on the short edges, for example a locking system as show in FIG. 1, and a locking system on the long edges, for example a locking system as shown in FIG. 2b, are designed such that a pullback force on the short edges exceeds the friction between the long edges and allow automatically a locking with a vertical snap action and without any side pressure.

Figure 5A:
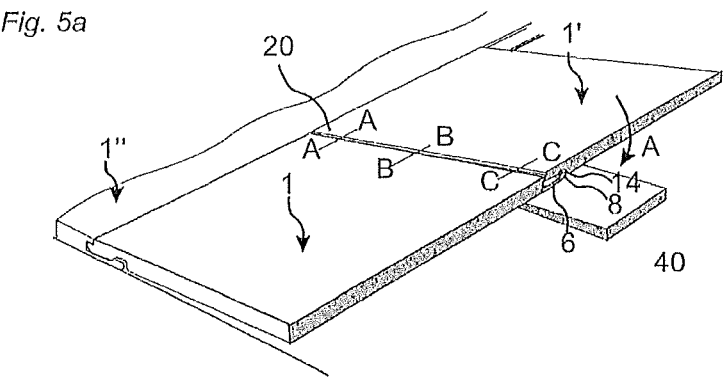
FIGS. 5a-5d show installation of floor panels according to an embodiment of the invention.
Figure 5B:
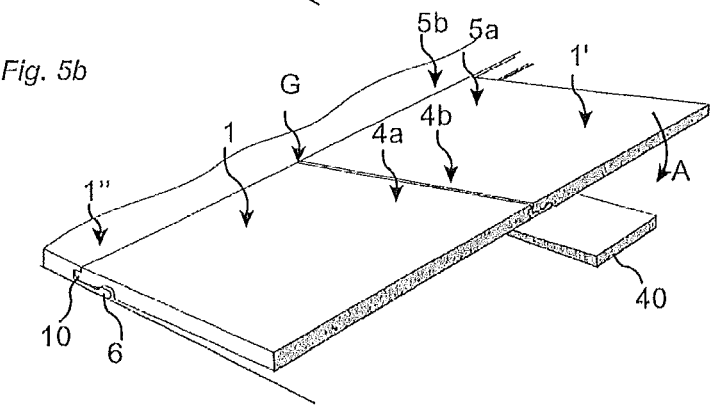
Figure 5C:
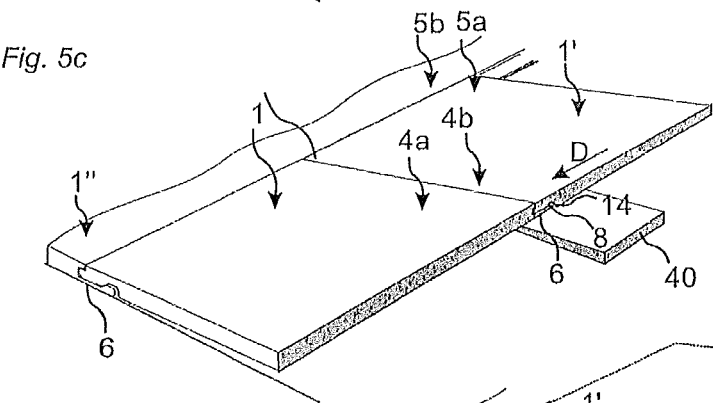
Figure 5D:
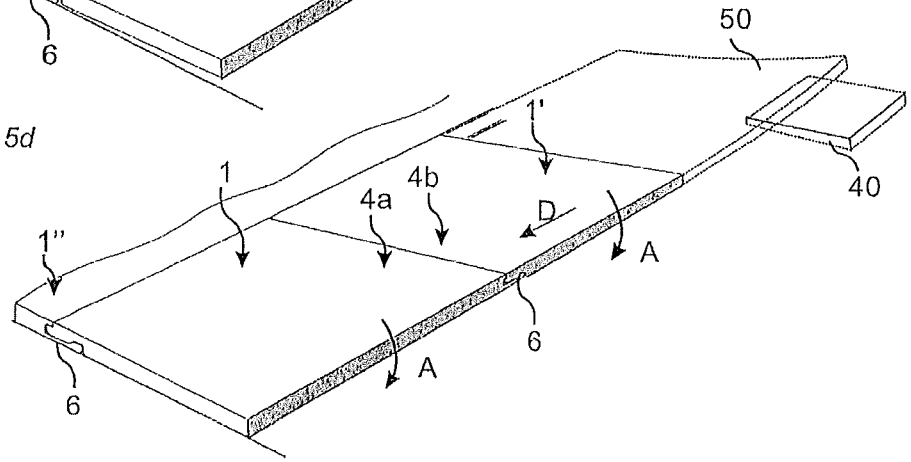

FIGS. 5a-5d show an installation method according to the invention. The same vertical snap folding motion as shown in FIGS. 3a-3c takes place with a vertical displacement and twisting of the strip 6 until the second 1 and new 1' panels are essentially in the same plane as shown in FIG. 5b. The panels are thereafter displaced horizontally by the horizontal pulling force between the locking element 8 and the locking groove 14 caused by the strip 6 that snaps back towards the initial position as shown in FIG. 5c. This horizontal displacement D takes place when the second and the new panels are angled against each other at least in an installation angle or preferably in a displacement angle where the friction between the long edges is lower than in a locking angle when the panels are locked in an essentially common plane. The second 1 and the new panel 1' are thereafter angled down to the sub floor as shown in FIG. 5d. The installation with this vertical snap folding method in angled position is facilitated if for example a wedge 40 or a similar device is used that keeps the panels in for example a displacement angle during the vertical snap folding. FIG. 5d shows that the friction between the long edges could also be reduced if the panels are twisted during installation. Especially thin laminate floorings could be installed with such a twisting of the new pane 1. The free short edge 50 has during the vertical snap folding action a higher angle than the locked edge 4b. The twisting could be done with or without a wedge. The panels are according to this embodiment of the invention configured such that the locking system on the short edges, for example a locking system as show in FIGS. 1a-1c, and a locking system on the long edges, for example a locking system as shown in FIG. 2a, are designed such that a pullback force on the short edges exceeds the friction between the long edges and allows a locking automatically with a vertical snap action when the panels are in a displacement angle. It is obvious that when the first two panels in a first row are installed, the locking could take place with a displacement of the strip panel, the folding panel or both panels and a twisting of any edge section could take place.

FIGS. 6a and 6b show vertical snap folding and the vertical pressure forces created by the twisting of the strip 6 on the short edge. FIG. 6a shows a position where the locking element 8 and the locking groove of a second 1 and a new 1' panel, at an inner section A-A, similar to FIG. 4a, are in an initial contact angle. Further angling, as shown in FIG. 6b, will create a vertical pressure force which will press the upper contact surfaces 33, 34 towards each other and the friction at a part of the long edges close to the short edges will increase in a locking angle and in a displacement angle. The short edges of especially thin panels could be curved, and this prevents an easy installation since the installer has to press on several parts of the short edge during installation. In thicker or narrow panels a centre pressure at a middle section B-B could be sufficient.

Figure 7A:
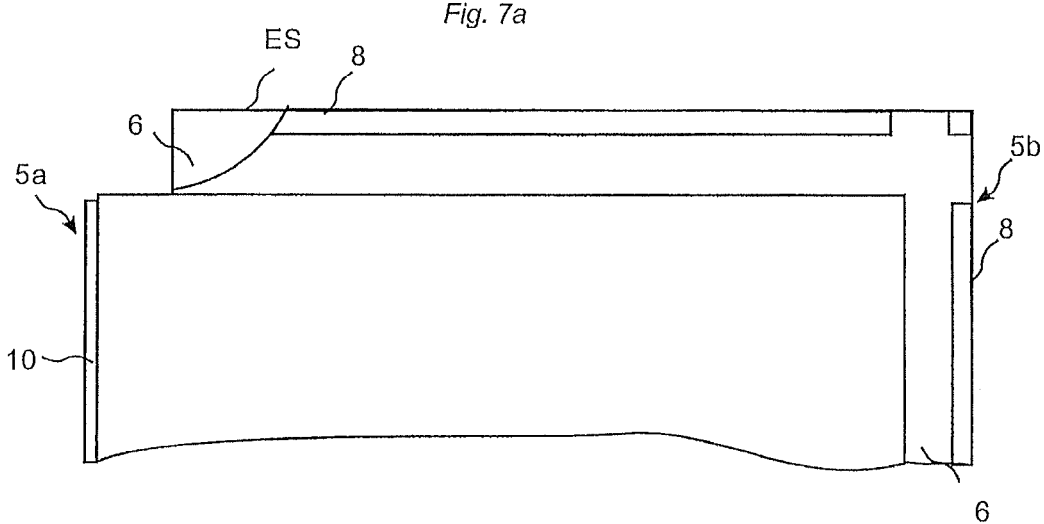
FIGS. 7a-7b show how a short edge strip could be formed according to embodiments of the invention.
Figure 7B:
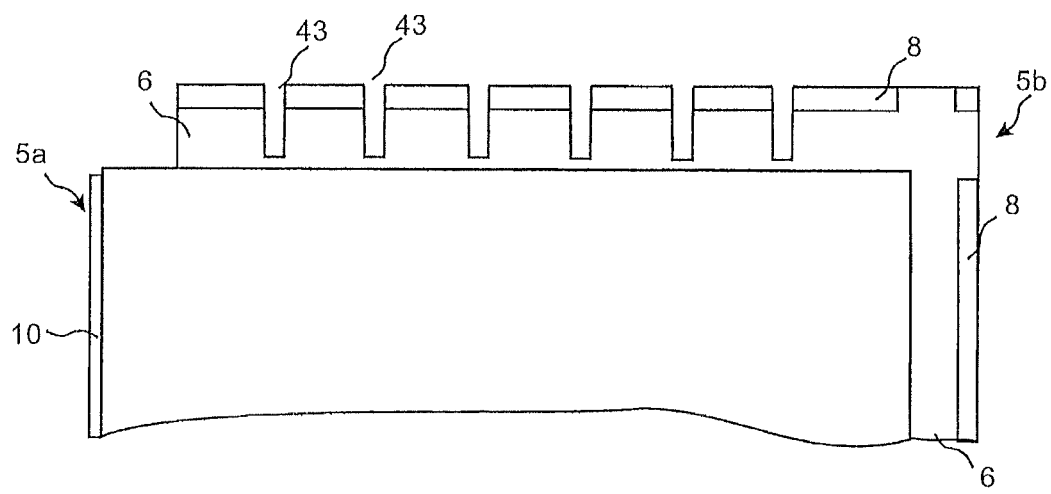

FIGS. 7a-7b show how such a vertical strip pressure could be reduced. The locking element could be removed at an edge section ES of the strip 6 close the long edge 5a which comprises the tongue 10. FIG. 7b show that vertical pressure could be reduced and twisting of the strip 6 could be facilitated if parts 43 of the strip 6 will be removed such that the horizontal extension of the strip will wary along the joint.

Figure 8A:
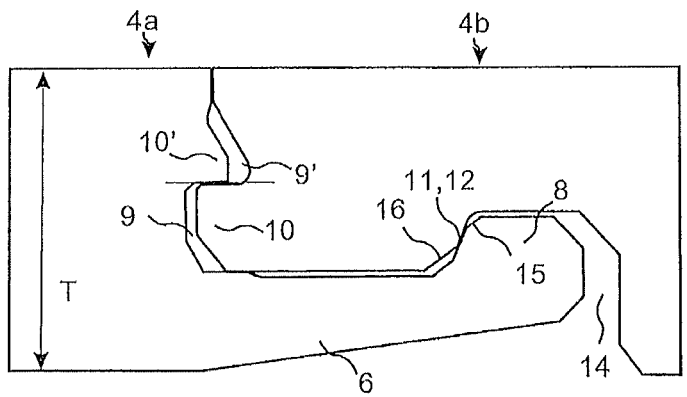
FIGS. 8a-8g show embodiments of locking systems according to the invention.

FIG. 8a show that a short edge locking system could for example have two tongues 10, 10' and two tongue grooves 9, 9' and that the tongue 10 or the tongue groove 9 could be located on the strip panel 4a or on the fold panel 4b. A double tongue system offers the advantage that no part of the locking system needs to be in contact with the upper sharp edge 17 of the surface, as can be seen in FIG. 4c, during the folding. This is an advantage especially in laminate floorings with a sharp laminate edge and a core of HDF. Such core is much softer than the laminate surface and could be partly compressed during folding.

Figure 8B:
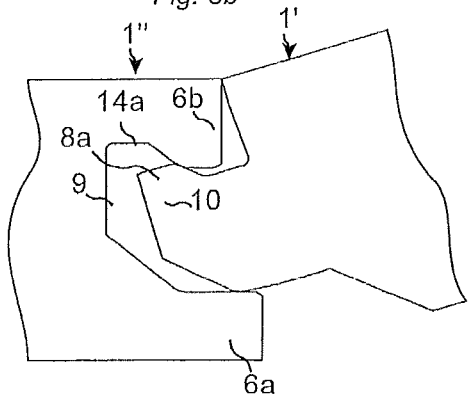
Figure 8C:
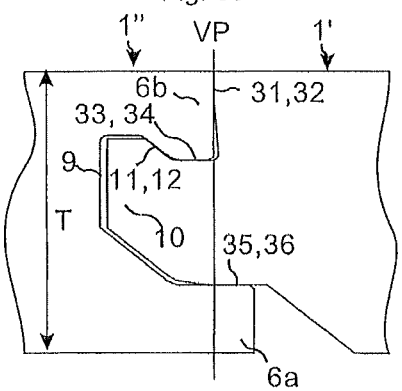

FIGS. 8b and 8c show that a long edge angling system according to the invention could also be formed as a tongue lock where a tongue 10 with a locking element 8a at its upper part locks into a groove 9 which has upper and lower lips 6a, 6b and an undercut part 14a cooperating with the locking element 8a.

Figure 8D:
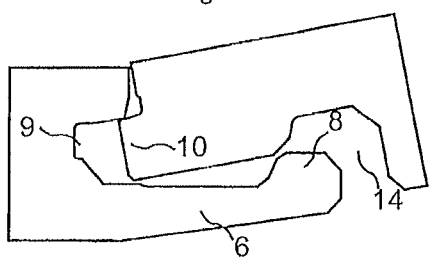
Figure 8E:
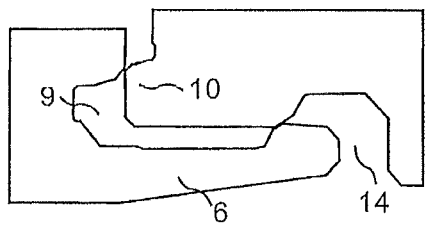
Figure 8F:
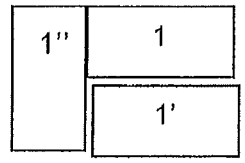
Figure 8G:
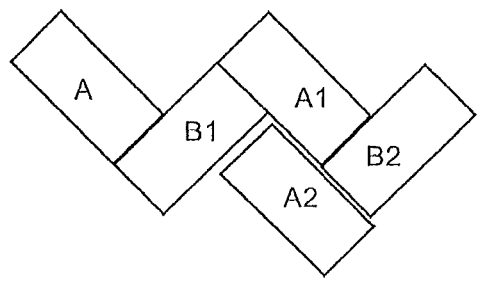

FIGS. 8d and 8e show that the locking system shown in FIGS. 1a-1c could be locked with angling and also with a combined horizontal and vertical snap action, provided that the tongue 10, the tongue grove 9 and the locking element 8 are adjusted according to for example FIG. 8e. Such locking systems could be used on long and short edges. They could be identical or of a similar type where the geometries have been adapted to specific requirements long and short edges. This means that the invention according to the first and the third principles could also be used to connect floor panels long edge to short edge with vertical snap folding in for example a diamond pattern, as shown in FIG. 8f, or in a herringbone pattern where mirror inverted locking systems with A and B boards could be used as described in WO 03/025307 and shown in FIG. 8g. FIG. 8f show that a short edge of a second panel 1 is locked, for example, with angling, vertical snapping, or horizontal snapping to a long edge of a first panel 1". A long edge of new panel 1' is locked with angling to the long edge of the second panel 1 and a short edge of the new panel 1' is locked with vertical snap folding to the first panel 1". FIG. 8g shows a first A-type panel A1 connected with a long edge to a short edge of a first B-type panel B1 and a short edge to a long edge of a second B-type panel B2. A long edge of a new A-type panel A2 is installed with angling to a long edge of a first A-type panel A1 and to a short edge of a second B-type panel B2. A short edge of the new A-type panel A2 is installed with vertical snap folding to the long edge of the first B-type panel B1.

FIG. 9a shows an embodiment of a vertical sliding locking system that could be locked with a combined vertical and horizontal sliding along a tongue plane TP, comprising the upper contact surfaces of the tongue 33 and the tongue groove 34 and a groove plane GP, comprising the groove locking surface 12 and the locking element locking surface 11. These surfaces are in this embodiment substantially plane but they could also be curved. The tongue and the groove planes TP, GP are, in such a case, tangent lines to the curves. The tongue plane TP and the groove plane GP are in this embodiment parallel and have a plane angle PA of about 50 degrees to the horizontal plane HP. The strip panel 4a will be locked to the fold panel 4b when the fold panel is displaced vertically and horizontally along the tongue plane TP as can be seen in FIGS. 9c and 9d. This locking and unlocking could be obtained without any bending of the strip 6 and without any resistance. Such a locking requires however that substantially the whole edge of the fold pane could be displaced vertically over a specific vertical locking distance VLD defined by the geometry of the locking system and such that a vertical locking is obtained during the vertical displacement. It is obvious that such a vertical displacement could be made when for example when both panels are laying on the floor with the folding panel edge 4b over the strip panel edge 4a and when these two edges are parallel. Such a displacement is however not possible if the folding panel 4a is in an angled position, which is substantially the displacement angle. This is the case when a vertical folding installation is used. The inner part of the short edge 20, as shown in FIG. 5a will be locked by the long sides, as shown in FIG. 2a, and cannot be displaced vertically along a vertical plane VP.

It is not necessary that the tongue plane TP and the groove plane GP are parallel. A groove plane GP could for example have a plane angle PA of about 70 degrees and the tongue plane TP could have a plane angle PA of for example about 60 degrees. This will increase the locking strength. A locking could be made with a small bending of the strip 6 and/or a compression of fibres or surfaces in the locking system. This locking could be made with very small locking resistance. Any other angle combination could be used but it is of course preferable that the groove plane has a higher angle than the tongue plane.

Figure 10A:
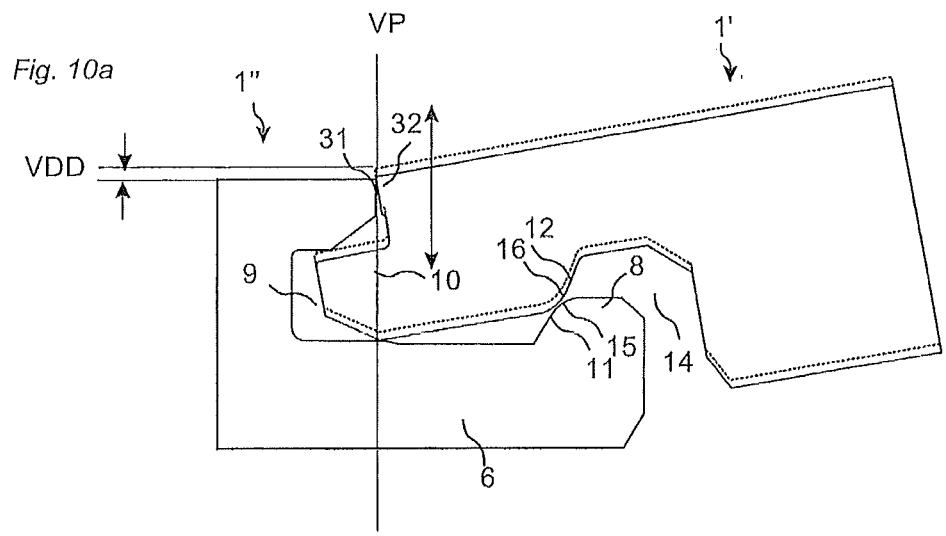
FIGS. 10a-10c show embodiments of long and short side locking systems according to the invention.
Figure 10B:
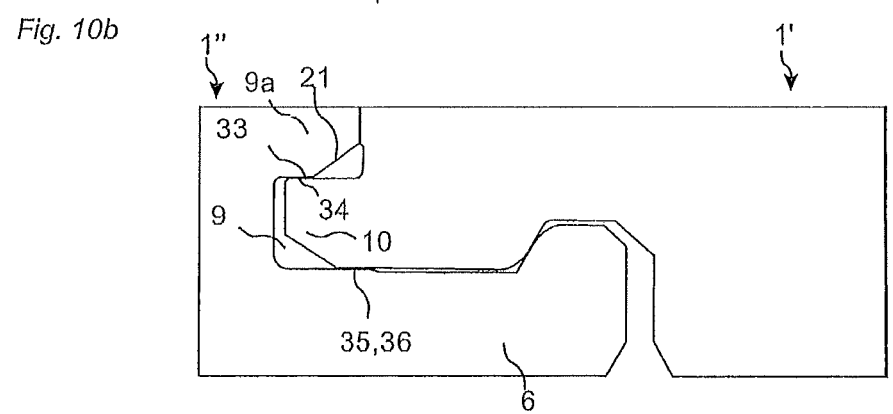
Figure 10C:
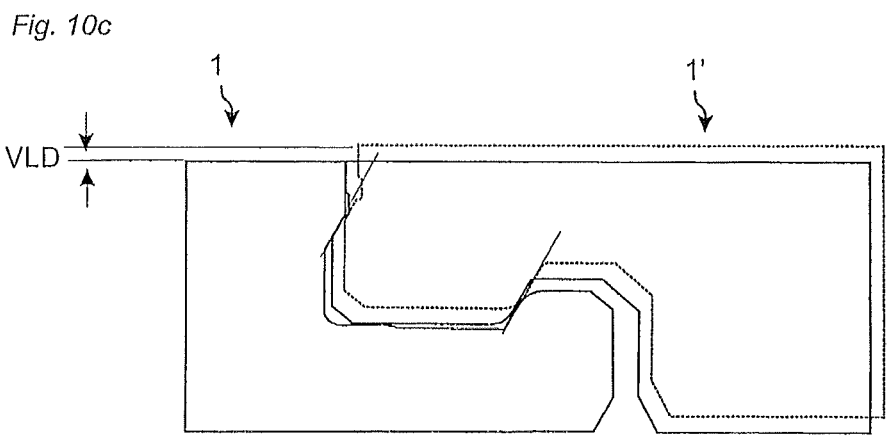

FIGS. 10a and 10b shows a locking system that is possible to displace vertically along a vertical displacement distance VDD in a displacement angle when the upper part of the locking element 8 is partly in the locking groove 14 and prevents horizontal displacement. Such a locking system could be designed in many different ways. This preferred embodiment differs from the embodiment shown in FIG. 2a. The tongue 10 is protruding horizontally from the upper edge over a considerably larger distance, for example more than 0.2 times the floor thickness, the upper tongue and groove contact surfaces 33, 34 have been moved towards the outer part of the tongue 10 and are displaced inwardly and horizontally relative the lower tongue and groove contact surfaces 35, 36. A large bevel 21 has been introduced in the upper lip, which extends over a vertical distance, which is about 0.5 times the distance of the protruding tongue. FIG. 10c show a preferred embodiment where the vertical locking distance VLD of the folding panel 1' is substantially the same as the vertical displacement distance VDD of the long side locking system in a displacement angle, as shown in FIG. 10a. Such a combination gives a very easy vertical folding especially if the tongue and groove planes have substantially the same angle. Preferable angles are for example TP/GP=50/50, 60/60, 50/60 and 60/70 and similar combinations. All other embodiments could be used. The strip panel and the folding panel could be designed according to the embodiments of FIGS. 1a-1c. A long edge locking system that allows vertical displacement in a displacement angle will also improve vertical folding with a locking system comprising substantially horizontal upper tongue/groove contact surfaces 33, 34.

FIG. 11a show a second 1 and new panel 1' with short edges 4a, 4b having a locking system as described in FIG. 9a. FIG. 11c shows that such a locking system has no horizontal locking strength since it could easily slide out along the tongue plane when a pulling force PF is applied. The fold panel 4b slides up horizontally and vertically. FIG. 11d show that such upward motion will be prevented by the long edges 5a and 5b when panels in the first row R1 and the third row R3 are connected to the long sides of the second 1 and new panels 1' in the second row R2. Vertical and horizontal separation of the edges 4a, 4b can only take place if the panels are able to move vertically and this is prevented by the locking system at the long edges (5a, 5b). The short edges could therefore be locked very easily without any resistance, and they are at the same time prevented to unlock by the locking system at the long edges that preferably should have a tight fit between the tongue and grove in order to prevent "over wood". The invention provides a very simple and easy locking with vertical folding that could be combined with a strong locking in vertical and horizontal direction.

Figure 12A:
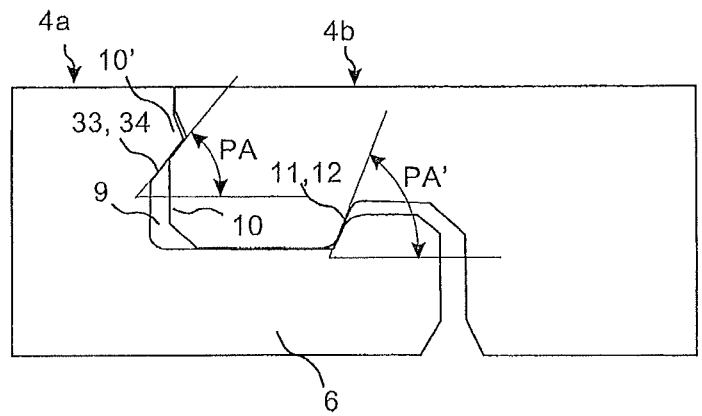
FIGS. 12a-12c show embodiments of short side locking systems according to the invention.
Figure 12B:
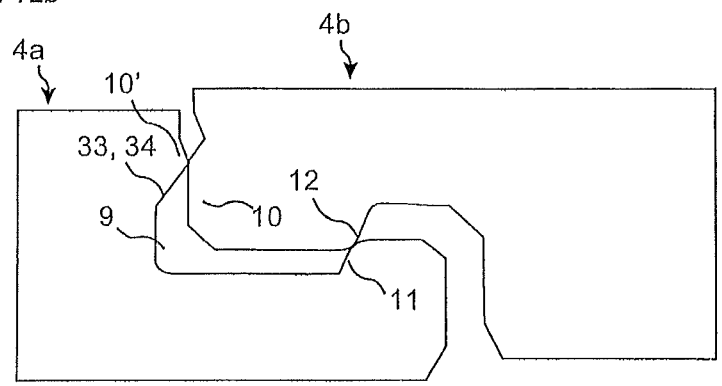
Figure 12C:
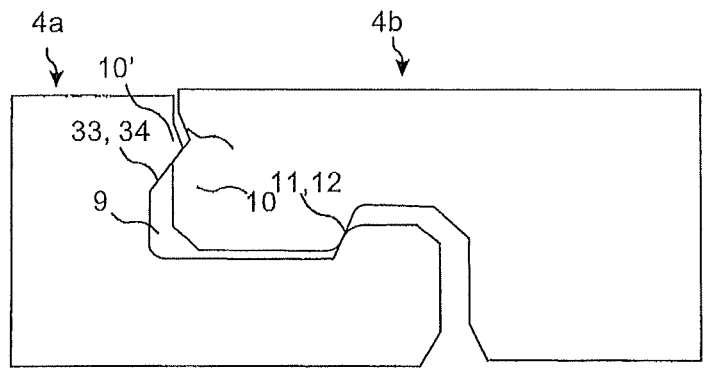

FIG. 12a-12c show that the vertical sliding locking principle could be combined with the double tongue principle. The locking system has a tongue 10, 10' on the folding panel 4b and on the strip panel 4a. The tongue plane has in this embodiment a plane angle PA that is lower than the plane angle PA' of the groove plane in order to increase the vertical locking strength. This means that some compression or bending must occur during folding, providing that the locking system has a tight fit. The double tongue principles make it possible to avoid displacement along the sharp surface edge during vertical folding. A compression of the tips of the two tongues during folding will allow an easier locking with higher strength.

It is obvious that two or more or even all of the principles described above could be combined and that all embodiments of locking systems described in this application could be used in combinations or independently to connect long and/or short edges. The figures are only used to show examples of different embodiments, which could be used in various combinations on long and short edges in a same panel type or in different panel types intended to be connected to each other. All locking systems on long and/or short edges of a panel could be formed in one piece with the core, or they could comprise separate materials, for example a separate tongue and/or strip and/or locking element, which could be integrated with the floor panel or even connected during installation. Also, the locking groove and/or the tongue groove could comprise separate materials. It should be especially pointed out that the invention also comprises one piece locking systems on the short edges where parts of the locking system, such as for example the tongue and/or the strip and/or the locking element, are flexible and preferably comprise a wood fibre based material, for example HDF, and which could be locked by vertical snap folding, provided that such locking systems must be displaced at least partially in a horizontal direction during the vertical snap folding. A separate wood fibre-based material such as HDF or plywood could also be fixed connected by for example gluing to a panel comprising a wood or wood lamella core and it could be machined to a locking system in the same way as the one-piece system described above.

Embodiments of the invention are especially useful in floor panels with a size of a parquet strip for example a panel with a length of less than about 100 cm and a width of less than about 12 cm. A limited length gives a lower friction, and a limited width gives more flexible panels where a "banana shaped" long edge will cause less friction than in a wide and rigid panel. The invention is therefore also useful in long and narrow flexible panels with for example a maximum width of about 10 cm. Other useful areas are floors with a tile shape for example where the length does not exceed 3 times the width. Floors with such panel sizes of for example 30*45 cm or 30*60 cm could be made with low friction on the long edges and a high pulling force on the short edges. Chemicals such as wax, oil and similar could be applied in the long edge locking system in order to reduce friction during installation.

It is an advantage if the floorboards will not slide easily after installation. Chemicals that are applied into the locking system could be designed to facilitate displacement during installation and to cure after installation in order to prevent displacement after installation. Glue in the locking system is not excluded. Glue could be applied for example in all long edge locking systems or only in some panels for example only in the first or the last panel in each row. This will prevent displacement of a whole row against an adjacent row. Special panels with long edge locking systems having a high friction could be supplied and used for example as a first panel in each row. Mechanical devices could be supplied that are inserted in the locking system, for example in the first panel in each row or under the panel or between the wall and the first and the last panel in each row, and such mechanical devices will prevent displacement after installation. Flexible materials applied between a short edge of a panel and a wall could prevent displacement and compensate for swelling and shrinking of the panels. An underlay or a rear side of the panel with a high friction surface could also be used.

The invention claimed is:

1. A set of essentially identical floor panels each comprising long and short edges,
    wherein the short edges are provided with a mechanical locking system comprising first and second connectors integrated with the floor panels,
    wherein the first and second connectors and the floor panels are made of a same material and are monolithic,
    wherein the first connector comprises a flexible locking strip with an upwardly directed locking element, at a first short edge of a floor panel, configured to cooperate with a downwardly open locking groove at an adjacent second short edge of another floor panel for connecting the adjacent edges horizontally,
    wherein the second connector comprises a first tongue, either at the first or the second short edge, extending horizontally, configured to cooperate with a horizontally open tongue groove, at the other of said first or second short edges, for connecting the adjacent edges in vertical direction and configured to be locked with a vertical motion,
    wherein the first tongue at one of the short edges is formed in one piece with the panel,
    wherein the short edge with the tongue groove is provided with a second tongue above the tongue groove, the second tongue protruding horizontally,
    wherein a length of the locking strip which extends from an inner most surface of the tongue groove to an outer most surface of the locking the strip is greater than a maximum thickness from an upper-most surface of the floor panel to a lower-most surface of the floor panel, and
    wherein the second tongue is spaced from the upper-most surface of the floor panel.

2. The set as claimed in claim 1, wherein the first tongue is configured to protrude from a substantially vertical upper surface at the short edge with the first tongue.

3. The set as claimed in claim 1, wherein the second tongue is configured to protrude from a substantially vertical upper surface at the short edge with the second tongue.

4. The set as claimed in claim 1, wherein an upper surface of the first tongue is substantially parallel to a locking surface of the locking groove.

5. The set as claimed in claim 1, wherein an angle of an upper surface of the first tongue against a horizontal plane is more than 45 degrees.

6. The set as claimed in claim 5, wherein an angle of a locking surface of the locking groove against the horizontal plane is greater than the angle of the upper surface of the first tongue.

7. The set as claimed in claim 6, wherein the angle of the locking surface of the locking groove is 10-30 degrees greater than the angle of the upper surface of the first tongue.

8. The set as claimed in claim 1, wherein a lower surface of the locking strip is positioned above a rear face of the floor panel.

9. A set of essentially identical floor panels each comprising long and short edges,
    wherein the short edges are provided with a mechanical locking system comprising first and second connectors integrated with the floor panels,
    wherein the first and second connectors and the floor panels are made of a same material and are monolithic,
    wherein the first connector comprises a flexible locking strip with an upwardly directed locking element, at a first short edge of a floor panel, configured to cooperate with a downwardly open locking groove at an adjacent second short edge of another floor panel for connecting the adjacent edges horizontally,
    wherein the second connector comprises a first tongue, either at the first or the second short edge, extending horizontally, configured to cooperate with a horizontally open tongue groove, at the other of said first or second short edges, for connecting the adjacent edges in vertical direction and configured to be locked with a vertical motion,
    wherein the first tongue at one of the short edges is formed in one piece with the panel,
    wherein the short edge with the tongue groove is provided with a second tongue above the tongue groove, the second tongue protruding horizontally,
    wherein a length of the locking strip which extends from an inner most surface of the tongue groove to an outer most surface of the locking the strip is greater than a maximum thickness from an upper-most surface of the floor panel to a lower-most surface of the floor panel,
    wherein a lower surface of the locking strip at an outer locking part is positioned above the rear face of the floor panel, and
    wherein the second tongue is spaced from the upper-most surface of the floor panel.

10. The set as claimed in claim 9, wherein the first tongue is configured to protrude from a substantially vertical upper surface at the short edge with the first tongue.

11. The set as claimed in claim 9, wherein the second tongue is configured to protrude from a substantially vertical upper surface at the short edge with the second tongue.

12. The set as claimed in claim 9, wherein an upper surface of the first tongue is substantially parallel to a locking surface of the locking groove.

13. The set as claimed in claim 9, wherein an angle of an upper surface of the first tongue against a horizontal plane is more than 45 degrees.

14. The set as claimed in claim 13, wherein an angle of a locking surface of the locking groove against the horizontal plane is greater than the angle of the upper surface of the first tongue.

15. The set as claimed in claim 14, wherein the angle of the locking surface of the locking groove is 10-30 degrees greater than the angle of the upper surface of the first tongue.

* * * * *